United States Patent
Axnäs et al.

(10) Patent No.: US 11,812,416 B2
(45) Date of Patent: Nov. 7, 2023

(54) COHERENT DETECTION OF LARGE PHYSICAL RANDOM ACCESS CONTROL CHANNEL (PRACH) DELAYS

(71) Applicant: Telefonaktiebolaget LM Ericsson (publ), Stockholm (SE)

(72) Inventors: Johan Axnäs, Solna (SE); Henrik Sahlin, Mölnlycke (SE); Andres Reial, Malmö (SE); Naga Vishnu Kanth Irukulapati, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 226 days.

(21) Appl. No.: 16/484,044

(22) PCT Filed: Feb. 6, 2018

(86) PCT No.: PCT/SE2018/050104
§ 371 (c)(1),
(2) Date: Aug. 6, 2019

(87) PCT Pub. No.: WO2018/143892
PCT Pub. Date: Aug. 9, 2018

(65) Prior Publication Data
US 2020/0092871 A1    Mar. 19, 2020

Related U.S. Application Data

(60) Provisional application No. 62/455,526, filed on Feb. 6, 2017.

(51) Int. Cl.
*H04W 72/04* (2023.01)
*H04W 72/044* (2023.01)
(Continued)

(52) U.S. Cl.
CPC ..... *H04W 72/044* (2013.01); *H04W 56/0055* (2013.01); *H04W 74/0891* (2013.01)

(58) Field of Classification Search
CPC .......... H04W 72/044; H04W 74/0891; H04W 56/0055
See application file for complete search history.

(56) References Cited

U.S. PATENT DOCUMENTS

| | | | |
|---|---|---|---|
| 6,658,063 B1 * | 12/2003 | Mizoguchi | H04L 27/2657 375/260 |
| 2005/0068886 A1 * | 3/2005 | Wang | H04L 27/2607 370/210 |

(Continued)

FOREIGN PATENT DOCUMENTS

| | | |
|---|---|---|
| CN | 105635002 A | 6/2016 |
| WO | 2008038958 A2 | 4/2008 |
| WO | 2015/188861 A1 | 12/2015 |

OTHER PUBLICATIONS

Ericsson, "RACH Design for E-UTRA TDD", TSG-RAN WG1 Lte Tdd Ad Hoc, R1-071891, Apr. 17-20, 2007, 4 pages.
(Continued)

*Primary Examiner* — Rhonda L Murphy
(74) *Attorney, Agent, or Firm* — Christopher & Weisberg, P.A.

(57) ABSTRACT

According to embodiments described herein, a long delay-detector improves delay estimation performance for PRACH for many practical deployment scenarios. This, for example, reduces the risk that the timing advance of the UE is set incorrectly and hence reduces the risk that subsequent communication fails and that the UE spreads unnecessary interference to other communication in the system.

23 Claims, 37 Drawing Sheets

(51) Int. Cl.
*H04W 56/00* (2009.01)
*H04W 74/08* (2009.01)

(56) References Cited

U.S. PATENT DOCUMENTS

2013/0315342 A1 11/2013 Um et al.
2014/0328309 A1* 11/2014 Comstock ........... H04W 72/082
   370/329
2015/0365975 A1 12/2015 Sahlin et al.
2018/0343647 A1* 11/2018 Pelletier ............ H04L 25/03942

OTHER PUBLICATIONS

International Preliminary Report on Patentability, PCT App. No. PCT/SE2018/050104, dated Aug. 15, 2019, 8 pages.
Onizawa et al., "A Fast Synchronization Scheme of OFDM Signals for High-Rate Wireless LAN", IEICE Transactions on Communication, vol. E82-B, No. 2, Feb. 1999, pp. 455-462.
Supplementary European Search Report and Search Opinion, EP App. No. 18747343.4, dated Nov. 9, 2020, 11 pages.
International Search Report and Written Opinion for International Application No. PCT/SE2018/050104, dated Jul. 6, 2018, 11 pages.
Yixin Li et al., "Low-Complexity Iteration-Based Interference Cancellation in Asynchronous Physical-Layer Network Coding," 2015, pp. 576-583, IET Communications.
Bao Nguyen et al., "Using Gaussian Pulses in Physical-Layer Network Coding with Symbol Misalignment," 2016, pp. 77-82, Communications Theory Workshop (AusCTW).
"3rd Generation Partnership Project; Technical Specification Group Radio Access Network; Evolved Universal Terrestrial Radio Access (E-UTRA); Physical channels and modulation (Release 14)," Sep. 2016, 170 pages, 3GPP TS 36.211 V14.0.0, 3GPP Organizational Partners.
"3rd Generation Partnership Project; Technical Specification Group Radio Access Network; Evolved Universal Terrestrial Radio Access (E-UTRA); Physical layer procedures (Release 14)," Dec. 2016, 414 pages, 3GPP TS 36.213 V14.1.0, 3GPP Organizational Partners.
"NR Prach preamble evaluations," Oct. 10-14, 2016, 5 pages, 3GPP TSG-RAN WG1 Meeting #86bis, R1-1609672, Ericsson, Lisbon, Portugal.
S. Sesia et al., "LTE, The UMTS Long Term Evolution, From Theory to Practice," 2011, pp. 398-404, Second Edition, John Wiley & Sons Ltd.
"3rd Generation Partnership Project; Technical Specification Group Radio Access Network; Evolved Universal Terrestrial Radio Access (E-UTRA); Physical channels and modulation (Release 11)," Jun. 2013, 108 pages, 3GPP TS 36.211 V11.3.0, 3GPP Organizational Partners.
"3rd Generation Partnership Project; Technical Specification Group Radio Access Network; Evolved Universal Terrestrial Radio Access (E-UTRA); Physical layer procedures (Release 11)," Jun. 2013, 176 pages, 3GPP TS 36.213 V11.3.0, 3GPP Organizational Partners.
Chinese Office Action and Search Report with English Machine Translation dated Sep. 3, 2021 for Patent Application No. 201880010504.8, consisting of 12—pages.
TSG-RAN WG1 LTE TDD Ad Hoc R1-071891; Title: RACH design for E-UTRA TDD; Agenda Item: 3.4; Source: Ericsson; Document for: Discussion and Decision; Date and Location: Apr. 17-20, 2007, Beijing, China, consisting of 4—pages.
EPO Communication dated Jun. 22, 2022 for Patent Application No. 18747343.4, consisting of 9—pages.

* cited by examiner

| Carrier frequency | Format | "η" | Sub-carrier spacing [kHz] | Time units T_s [us] | Slot length [us] | PRACH preamble length [us] | PRACH preamble length [sample] | Length of PRACH OFDM symbol [us] | Number of repetitions of PRACH OFDM symbols | PRACH allocation [#sub-frames] | Guard interval [us] | Max cell range [km] |
|---|---|---|---|---|---|---|---|---|---|---|---|---|
| Sub 6 GHz | A0 | 1 | 15 | 3.255E-02 | 1000 | 233.25 | 7165.44 | 66.67 | 3.50 | 0.25 | 10.75 | 2.51 |
| | A1 | 1 | 15 | 3.255E-02 | 1000 | 466.67 | 14336 | 66.67 | 7.00 | 0.5 | 33.33 | 5.00 |
| | A2 | 1 | 15 | 3.255E-02 | 1000 | 933.33 | 28672 | 66.67 | 14.00 | 1 | 66.67 | 10.00 |
| | A3 | 1 | 15 | 3.255E-02 | 1000 | 866.67 | 26624 | 66.67 | 13.00 | 1 | 133.33 | 20.00 |
| | A4 | 1 | 15 | 3.255E-02 | 1000 | 1866.67 | 57344 | 66.67 | 28.00 | 2 | 133.33 | 20.00 |
| | A5 | 1 | 15 | 3.255E-02 | 1000 | 2800.00 | 86016 | 66.67 | 42.00 | 3 | 200.00 | 30.00 |
| | B0 | 2 | 30 | 1.628E-02 | 500 | 117.29 | 7205.4 | 33.33 | 3.52 | 0.25 | 7.71 | 1.16 |
| | B1 | 2 | 30 | 1.628E-02 | 500 | 233.33 | 14336 | 33.33 | 7.00 | 0.5 | 16.67 | 2.50 |
| | B2 | 2 | 30 | 1.628E-02 | 500 | 466.67 | 28672 | 33.33 | 14.00 | 1 | 33.33 | 5.00 |
| | B3 | 2 | 30 | 1.628E-02 | 500 | 433.33 | 26624 | 33.33 | 13.00 | 1 | 66.67 | 10.00 |
| | B4 | 2 | 30 | 1.628E-02 | 500 | 933.33 | 57344 | 33.33 | 28.00 | 2 | 66.67 | 10.00 |
| | B5 | 2 | 30 | 1.628E-02 | 500 | 1400.00 | 86016 | 33.33 | 42.00 | 3 | 100.00 | 15.00 |

FIG. 21B

| Carrier frequency | Format "n" | | Sub-carrier spacing | Time units $T\_s$ | Slot length | PRACH preamble length | | Length of PRACH OFDM symbol | Number of repetitions of PRACH OFDM symbols | PRACH allocation | Guard interval | Max cell range |
|---|---|---|---|---|---|---|---|---|---|---|---|---|
| | | | [kHz] | [us] | [us] | [us] | [sample] | [us] | | [#sub-frames] | [us] | [km] |
| Above 6 GHz | A0 | 8 | 120 | 4.069E-03 | 125 | 29.16 | 7165.44 | 8.33 | 3.50 | 0.25 | 2.09 | 0.31 |
| | A1 | 8 | 120 | 4.069E-03 | 125 | 58.33 | 14336 | 8.33 | 7.00 | 0.5 | 4.17 | 0.63 |
| | A2 | 8 | 120 | 4.069E-03 | 125 | 116.67 | 28672 | 8.33 | 14.00 | 1 | 8.33 | 1.25 |
| | A3 | 8 | 120 | 4.069E-03 | 125 | 108.33 | 26624 | 8.33 | 13.00 | 1 | 16.67 | 2.50 |
| | A4 | 8 | 120 | 4.069E-03 | 125 | 233.33 | 57344 | 8.33 | 28.00 | 2 | 16.67 | 2.50 |
| | A5 | 8 | 120 | 4.069E-03 | 125 | 350.00 | 86016 | 8.33 | 42.00 | 3 | 25.00 | 3.75 |
| | B0 | 16 | 240 | 2.035E-03 | 62.5 | 14.66 | 7200.4 | 4.17 | 3.52 | 0.25 | 0.96 | 0.14 |
| | B1 | 16 | 240 | 2.035E-03 | 62.5 | 29.17 | 14336 | 4.17 | 7.00 | 0.5 | 2.08 | 0.31 |
| | B2 | 16 | 240 | 2.035E-03 | 62.5 | 58.33 | 28672 | 4.17 | 14.00 | 1 | 4.17 | 0.63 |
| | B3 | 16 | 240 | 2.035E-03 | 62.5 | 54.17 | 26624 | 4.17 | 13.00 | 1 | 8.33 | 1.25 |
| | B4 | 16 | 240 | 2.035E-03 | 62.5 | 116.67 | 57344 | 4.17 | 28.00 | 2 | 8.33 | 1.25 |
| | B5 | 16 | 240 | 2.035E-03 | 62.5 | 175.00 | 86016 | 4.17 | 42.00 | 3 | 12.50 | 1.88 |

FIG. 21C

COHERENT DETECTION OF LARGE PHYSICAL RANDOM ACCESS CONTROL CHANNEL (PRACH) DELAYS

CROSS-REFERENCE TO RELATED APPLICATIONS

This application is a National stage of International Application No. PCT/SE2018/050104, filed Feb. 6, 2018, which claims priority to U.S. Application No. 62/455,526, filed Feb. 6, 2017, which are hereby incorporated by reference.

TECHNICAL FIELD

The present disclosure relates to random access in wireless communication systems, and in particular to a radio network node, a wireless device, and methods for transmitting and processing preambles to calculate a propagation delay between a user equipment (UE) and a radio network node in a wireless communication system.

BACKGROUND

In a typical radio communication system (e.g., a system based on Long-Term Evolution (LTE)), the first transmission that a user equipment (UE) performs after it has been switched on is a transmission of a preamble on a physical random access control channel (PRACH). The PRACH preamble typically is a synchronization sequence, serving the purposes of (i) informing the network about the presence of a new UE that would like to join the network, and (ii) allowing the network to estimate the propagation delay between the UE and the network transmission and reception point (TRP).

The estimation of the propagation delay in (ii) is possible since the UE makes its PRACH transmission a certain time interval after hearing a synchronization channel transmission transmitted by the TRP on the downlink. The estimated propagation delay is then used to configure the UE with a timing advance, i.e. the UE in any subsequent transmissions compensates for the propagation delay by transmitting early and thereby ensures that transmissions reach the TRP at the desired point in time.

The propagation delay (e.g., or more precisely in this context, the round-trip time (RTT), or twice the propagation delay) may be rather large, several times larger than the cyclic prefix (CP) of an orthogonal frequency-division multiplexing (OFDM) symbol, or even much larger than an entire OFDM symbol. Therefore, for accurate detection with the large delay uncertainty, LTE uses for PRACH a special, very long OFDM symbol that has a long CP and is based on a Discrete Fourier Transform (DFT) that is twelve (12) times larger than the normal DFT. Although this solution may work well in LTE, in the Fifth generation (5G) radio communication systems, where large antenna arrays will be a cornerstone, the potential need for a special large DFT in application-specific integrated circuits (ASIC) for every antenna branch can be undesirable for an implementation. There are also other potential issues, e.g., related to co-existence of different signal numerologies.

SUMMARY

Systems, methods, apparatuses, computer program products, and machine-readable media are provided for processing preamble sequences used to determine a timing advance based on a calculated propagation delay between a user equipment (UE) and a radio network node in a wireless communication system.

According to embodiments, a method in a radio network node for processing a preamble used in a wireless communication system comprises receiving, from a user equipment (UE), the preamble including a plurality of short sequences; determining, by a preamble detector, a fractional-symbol delay ($T_{frac}$) of the plurality of short sequences; and based at least in part on the determined $T_{frac}$, at least one of a first part of the preamble detector, the first part used to detect portions of the preamble arriving during an early time window of the plurality of time windows, and a second part of the preamble detector, the second part used to detect portions of the preamble arriving during a late time window of the plurality of time windows, to process at least one short sequence of the plurality of short sequences as part of calculating a propagation delay between the UE and the radio network node.

According to embodiments, a method in a UE for transmitting a preamble, wherein the preamble is comprised of a plurality of short sequences, the method comprising: transmitting, by the UE, the preamble to a radio network node, the transmitting including changing a transmission characteristic part way through the transmission of the preamble to split the preamble into two portions, wherein the transmitting includes: transmitting a first of the two portions of the preamble using a first transmission characteristic; and transmitting a second of the two portions of the preamble using a second transmission characteristic that is different from the first transmission characteristic.

According to embodiments, a method in a radio network node for processing a preamble comprises: detecting a change in a transmission characteristic of a preamble received from a user equipment (UE) part way through receiving the preamble, the change in transmission characteristic splitting the preamble into two portions, wherein the preamble includes a plurality of short sequences; determining, based on the two portions of the preamble, a propagation delay between the radio network node and the UE.

Among other benefits, the embodiments described herein improve the performance of radio network nodes performing delay estimation. By improving the performance of delay estimation, for example, the risk that the timing advance of a UE is set incorrectly is reduced, thereby further reducing the risk that subsequent communication with the UE fails and the risk that the UE spreads unnecessary interference to other communication in the system.

BRIEF DESCRIPTION OF THE DRAWINGS

Embodiments of the invention may best be understood by referring to the following description and accompanying drawings that are used to illustrate particular embodiments of the invention. In the drawings:

FIGS. 21B and 21C illustrate proposals of formats to be supported for PRACH preambles according to some embodiments.

DETAILED DESCRIPTION

Figure 1:
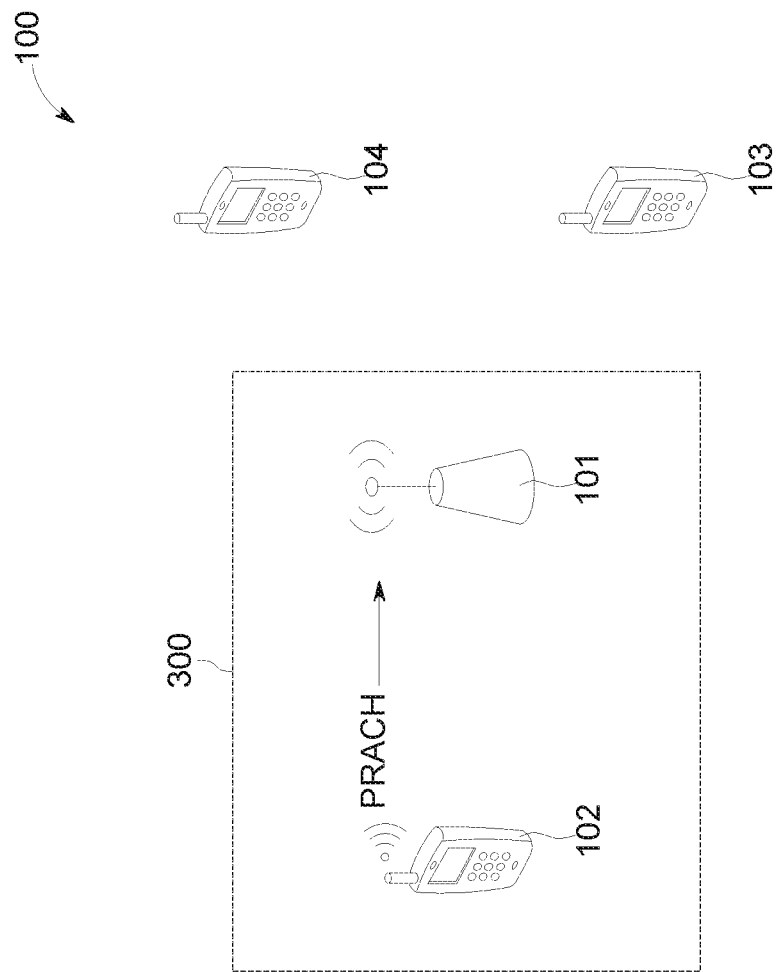
FIG. 1 is a schematic overview of a radio access network with wireless devices and a network node comprising a preamble receiver according to some embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

1.0. Overview

In a typical radio communication system (e.g., LTE), the first transmission that a UE performs after it has been switched on is a transmission of a preamble on a physical random access control channel (PRACH). The PRACH preamble is typically just a synchronization sequence, serving the purposes of informing the network about the presence of a new UE that would like to join the network, and allowing the network to estimate the propagation delay between UE and the network transmission and reception point (TRP).

The estimation is possible since the UE should make its PRACH transmission a certain time interval after hearing a synchronization channel transmission transmitted by the TRP on the downlink. The estimated propagation delay is then used to configure the UE with a timing advance, i.e., the UE in any subsequent transmissions compensates for the propagation delay by transmitting early and thereby ensures that transmissions reach the TRP at the desired point in time.

The propagation delay may be rather large, several times larger than the cyclic prefix (CP) of an OFDM symbol, or even much larger than an entire OFDM symbol. Therefore, for accurate detection with the large delay uncertainty, LTE uses for PRACH a special, very long OFDM symbol that has a long CP and is based on a DFT that is 12 times larger than the normal DFT. Although this solution may work well in LTE, in 5G radio communication systems, where large antenna arrays will be a cornerstone, the potential need for a special large DFT in ASIC for every antenna branch can be undesirable for an implementation. There are also other potential issues, e.g., related to co-existence of different signal numerologies.

2.0. System Overview

FIG. 1 shows a radio access network 100 with wireless devices 102, 103, 104 and a network node 101 comprising a preamble receiver. One of the wireless devices 102 is performing random access to the network node 101, where the random access comprises generating and transmitting a preamble sequence to the network node 101, which preamble sequence is received by the preamble receiver in the network node 101.

The network node 101 may be one of a repeater, a base radio, a base station (BS), an evolved Node B (eNB or eNodeB), a 5G base station (gNB), a base transceiver station, an access point, or another type of infrastructure equipment interfacing with one or more wireless devices such as wireless devices 102-104. A wireless device such as wireless devices 102-104 may be a user equipment (UE), which is used by an end-user to communicate, which may be, for example, a mobile phone, a smartphone, a phablet, a multimedia phone, a Voice Over Internet Protocol (VOIP) phone, a terminal, a portable media player, a GPS unit, a wearable device, a gaming system, a set-top box, or an Internet enabled household appliance. In one embodiment, a network node includes an electronic device. In one embodiment, a wireless device includes an electronic device. In one embodiment, the network node and the wireless device are each a separate electronic device.

In case of an LTE based radio access network 100, the random access is performed over the PRACH. Random access in LTE and other radio technologies is used both to facilitate initial access for a wireless device 102 into a radio access network 100 and also for timing offset estimation between wireless device 102 transmissions and reception at the network node 101.

Figure 2:
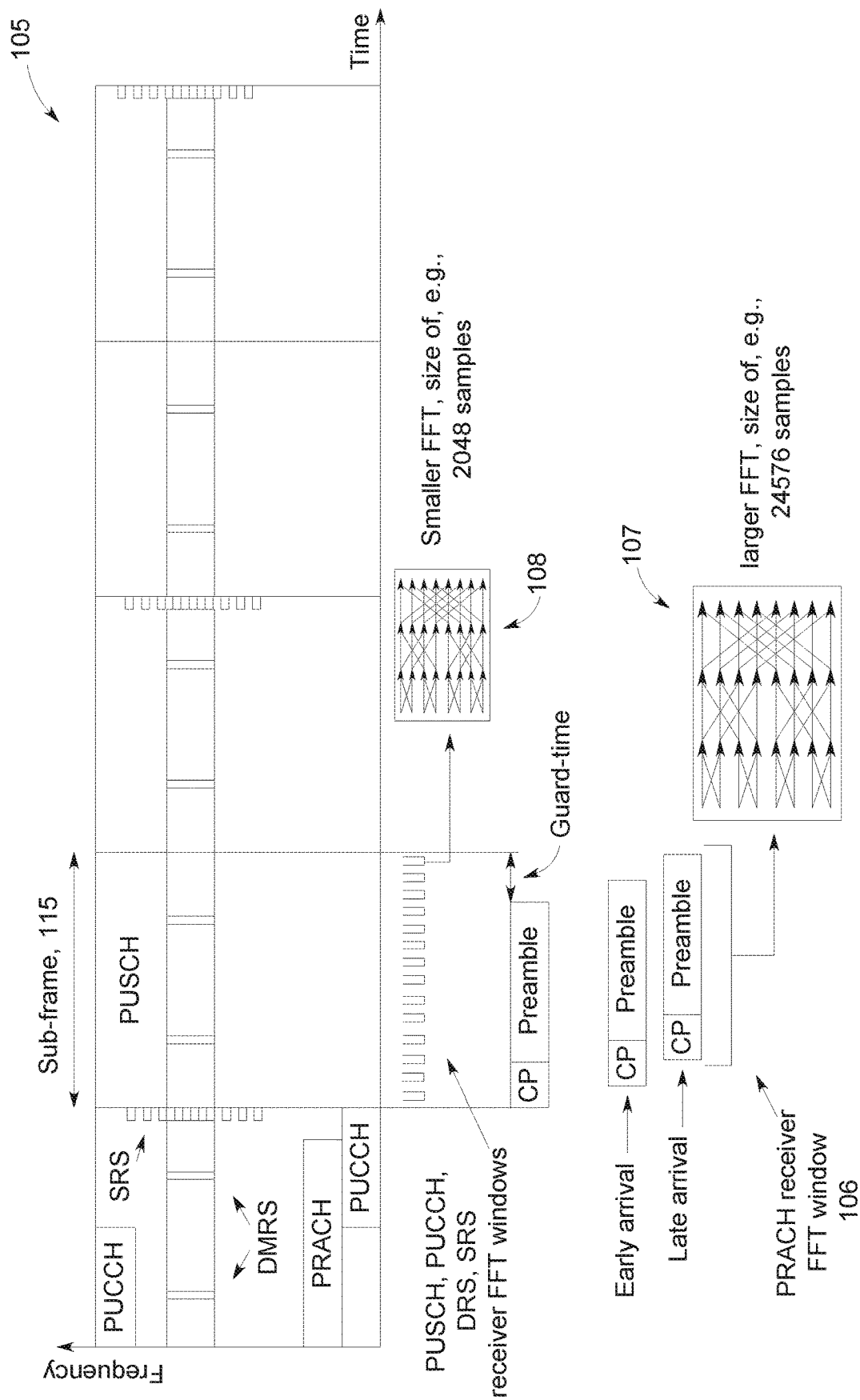
FIG. 2 illustrates signaling in a radio access network according to some embodiments.

FIG. 2 illustrates signaling in a radio access network such as the radio access network 100 shown in FIG. 1. When a wireless device, such as the wireless device 102 shown in FIG. 1, uses the PRACH, it transmits a so-called random-access preamble sequence, or preamble sequence for short, in a known time/frequency resource in the OFDM grid 105. An illustration of a PRACH receiver Fast Fourier Transform (FFT) window 106 is shown in FIG. 2. The FFT 107 used for processing PRACH is, as noted above, often larger than the FFT 108 used to process other OFDM symbols. This large FFT 107 drives complexity and power consumption in many systems, and potentially also increases the need for cooling of the preamble receiver.

Implementing methods that require a large FFT can be especially burdensome in emerging fifth generation 5G technologies, where the use of very many antenna elements is foreseen. This is because the large FFT 107 typically is determined for each separate antenna, or subset of antennas, such that different users and channels in different sub-bands of the received signal can be extracted before further signal processing.

Further, the PRACH preamble as specified in LTE covers a time interval which is much longer than the length of OFDM symbols used for other transmissions such as user data symbols. Current PRACH preamble receivers are thus designed under the assumption that propagation conditions are not varying significantly during the length of the preamble. This may be problematic, since assumptions, or constraints, are placed on the communication system as a consequence of this assumption. These constraints include, e.g., expectations on low wireless device speed, i.e., Doppler spread, low frequency errors and low Doppler shifts, and also low phase noise in transmitters and receivers.

3.0. PRACH Overview

Figure 3:
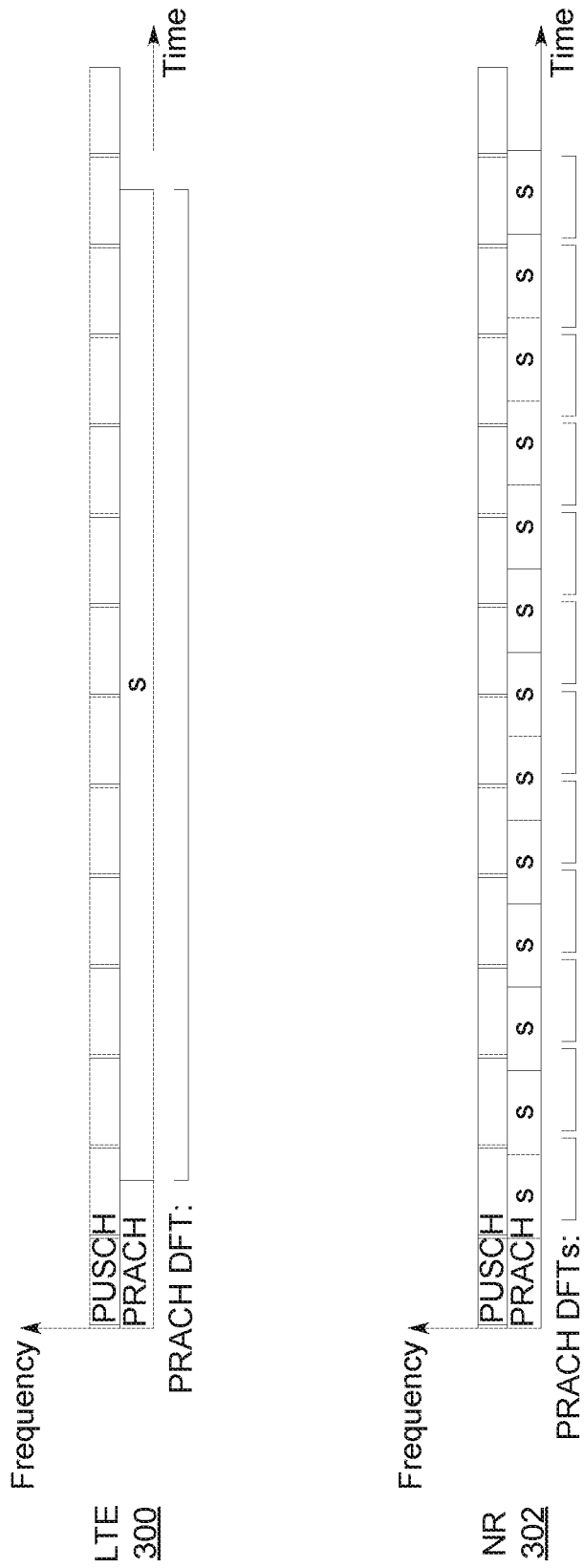
FIG. 3 illustrates a LTE PRACH format and a proposed PRACH format for New Radio (NR) according to some embodiments.

In one embodiment, instead of using the special long OFDM symbol, a normal OFDM symbol repeated multiple times was used without CP in between. For example, see "NR" in FIG. 3, which illustrates a LTE PRACH format 300 and a proposed PRACH format 302 for New Radio (NR).

Figure 4:
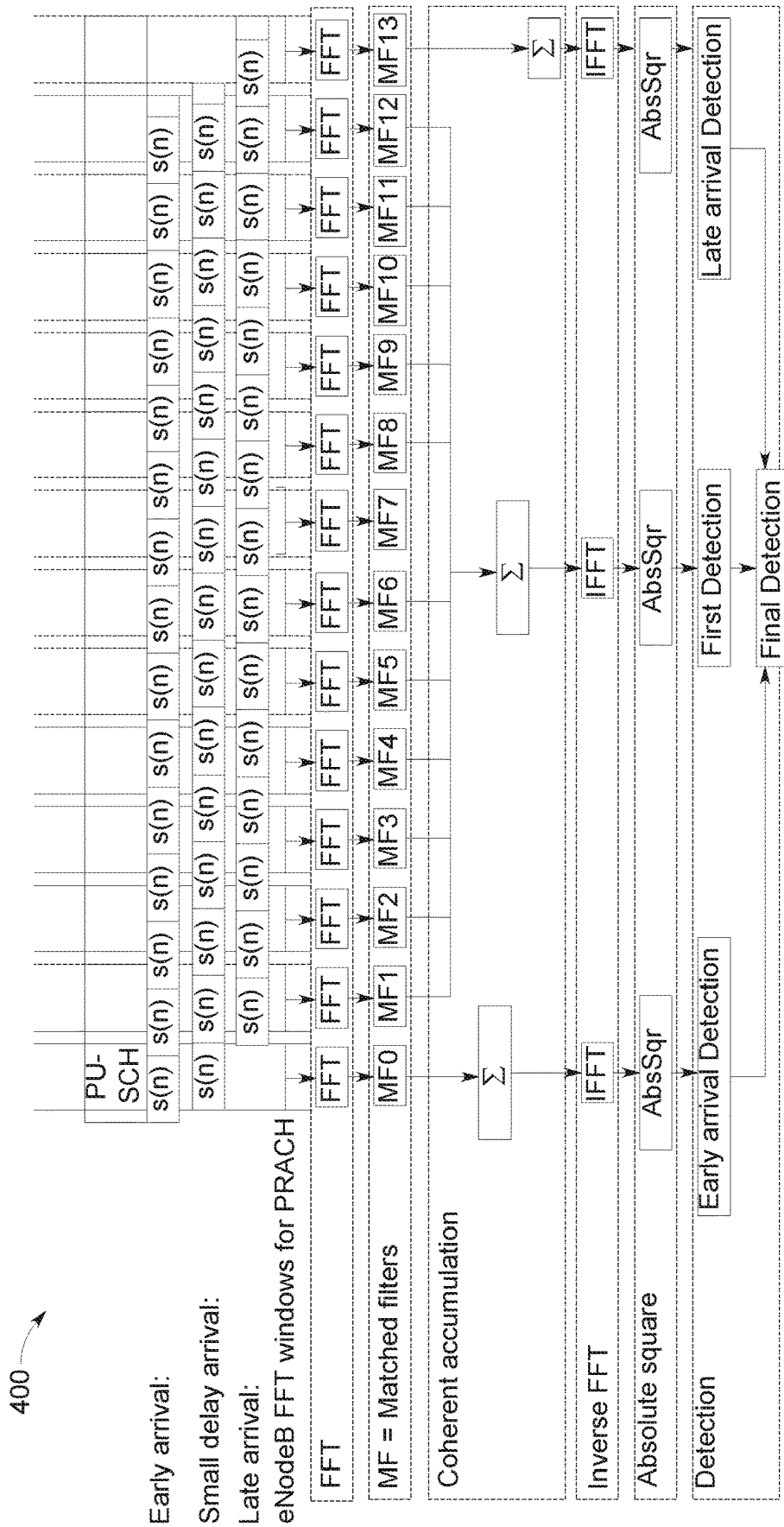
FIG. 4 illustrates a long-delay detector according to some embodiments.
Figure 5:
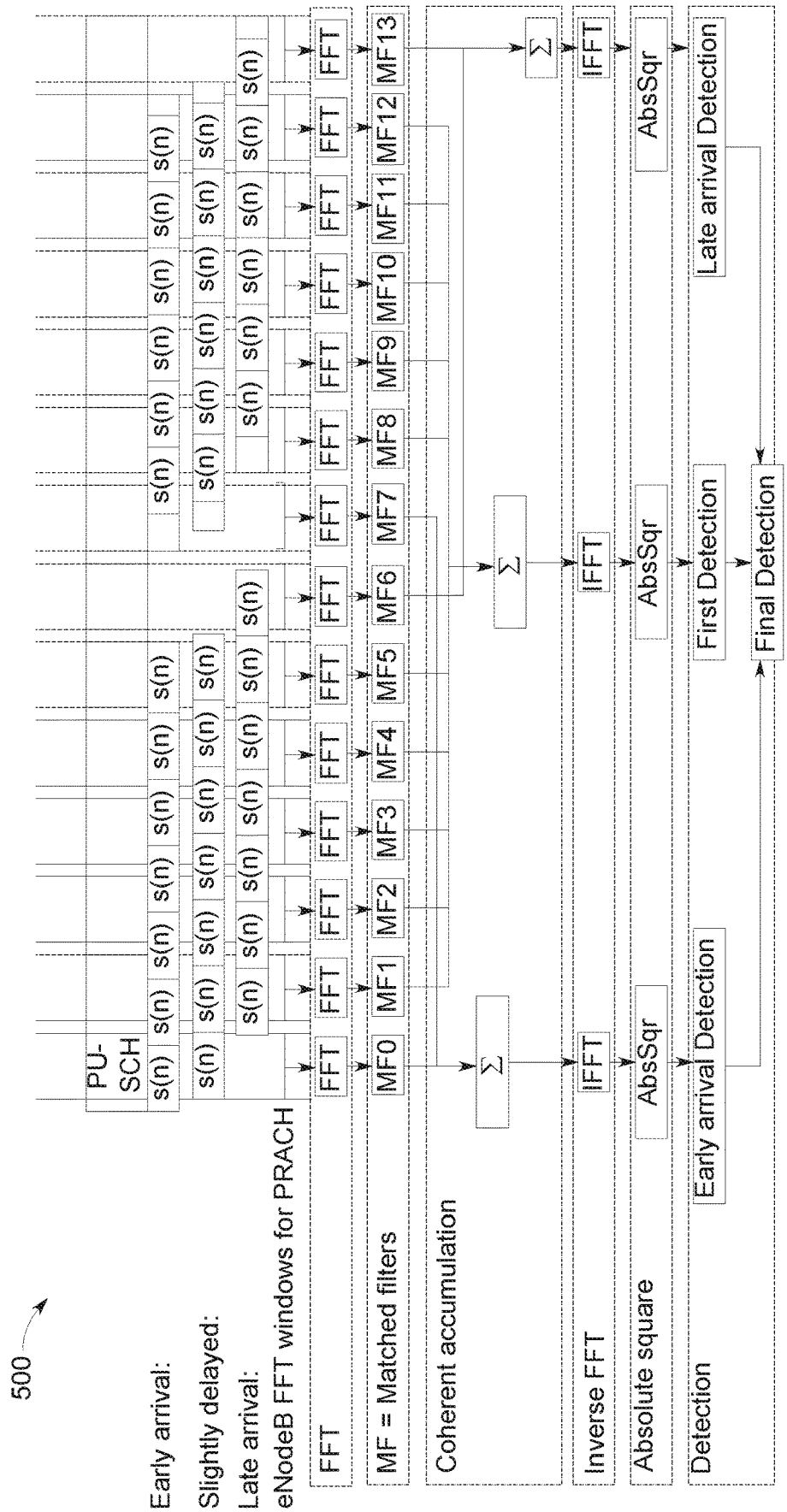
FIG. 5 illustrates a long-delay detector utilizing a gap according to some embodiments.
Figure 6:
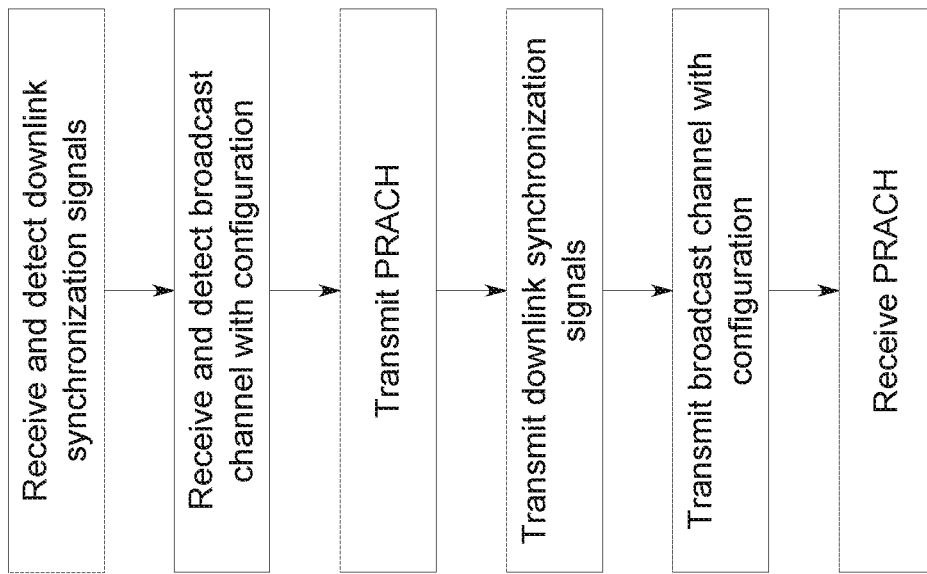
FIG. 6 is a flow-type diagram illustrating operations for PRACH preamble detection and round-trip estimations according to some embodiments.

With this format 302, each OFDM symbol effectively serves as a long CP to the next OFDM symbol. However, one potential issue with this solution is that it makes it more difficult to distinguish delays larger than one OFDM symbol, i.e., if the total delay is $N \cdot T_{OFDM} + T_{frac}$, where N is an integer ≥0, $T_{OFDM}$ is the length of the OFDM symbol DFT, and $0 \leq T_{frac} < T_{OFDM}$, then a typical correlation-based detector scanning a receive window within the preamble would be able to accurately determine $T_{frac}$, but not at all determine N. Therefore, it was proposed in U.S. patent application Ser. No. 14/366,324, published as U.S. Publ. No. 2015/0365975A1, which is filed Jun. 11, 2014 and hereby incorporated by reference, to use early- and late-arrival energy detectors. FIG. 4 illustrates a long-delay detector 400. In this approach, by comparing energies from late and early arrivals, delays larger than one OFDM symbol can be distinguished. Furthermore, in order to further improve performance. FIG. 5 illustrates a long-delay detector 500 utilizing a gap in the preamble.

PRACH may also be used in some other situations, e.g. at handover. All the above applies to a varying extent also in such situations.

However, early/late energy detectors may yield performance that is substantially worse than what can be achieved with the LTE solution with a long DFT. One reason is that the energy in the early/late windows is not large enough to reliably detect the energy difference and make the determination of N in $T_{frac} + N \cdot T_{OFDM}$ as reliable as the determination of $T_{frac}$.

The reliability in the determination of N can be improved by introducing one or more gaps as described above (and as illustrated in FIG. 5), but this at the same time degrades the reliability of the determination of $T_{frac}$ because of the lost receive energy in the gaps.

4.0. Additional Overview

The 4G wireless access within LTE is based on OFDM in downlink and DFT-spread OFDM (a.k.a. SC-FDMA) in uplink. Here, the uplink consists of the physical channels PUSCH, PUCCH, and PRACH and of the physical signals DMRS, and SRS. According to the 3GPP specification (for example, see 3GPP TS 36.211), the PUSCH, PUCCH, DMRS, and SRS all use an IFFT of size 2048 in the transmitter, with a sampling rate of 30.72 MHz. Dedicated hardware is commonly used for these IFFTs. The same size of 2048 can be used for the FFT in the receiver. However, with another sampling rate than 30.72 MHz, the IFFT and FFT size will change accordingly.

The Physical Random-Access Channel (PRACH) is used for initial access for a UE and timing offset estimation. For example, a description of this procedure is given in 3GPP TS 36.213. Upon reception in the eNodeB, the PRACH must thus be detected with high accuracy and accurate timing offset estimations must be done.

An illustration of PRACH is specified for LTE Release 8 (for example, see 3GPP TS 36.211). Five different formats are specified where PRACH consists of one or two preambles, each of length 24576 samples. The preambles have a cyclic prefix of length between 3168 and 21024 samples for formats 0 to 3.

Here, both a full frequency domain and a hybrid time-frequency approaches for detecting PRACH preambles are presented. In a full frequency domain approach, the received signal is processed with an FFT corresponding to the length of the preamble. Hence, a special long FFT (of length 24576) is thus required for each antenna. Dedicated hardware is commonly used for this PRACH FFT. After this large FFT, the PRACH bandwidth is extracted, which is a subset of the output from this large FFT. In the hybrid time-frequency approach, a low-pass filter is first used in the time domain in order to extract the PRACH bandwidth. This lowpass filter is followed by an FFT of a size much smaller than 24576. One such low-pass filter has to be applied to each antenna signal.

With the emerging 5G technologies, the use of very many antenna elements is of great interest. Here, an FFT is typically calculated for each antenna or subset of antennas, such that different users and channels in different sub-bands of the received signal can be extracted before further signal processing.

At initial setup, a UE starts by receiving and synchronizing to some type of downlink synchronization signals. As an example, in LTE, the UE starts by detecting the PSS (Primary Synchronization Signal) after which the UE has a sub-frame synchronization, OFDM symbol synchronization, and know the cell identity (cell ID) group. Then the UE detects SSS (Secondary Synchronization Signal), after which the UE is frame synchronized and knows the cell ID. These PSS and SSS are transmitted in subframe 0 and 25 in a dynamic TDD system.

The UE might then be configured by receiving and detecting system information carried by a broadcast signal. In LTE, this broadcast information is carried by PBCH (Physical Broadcast Channel). This broadcast information can relate to time and frequency allocation of PRACH, such that the UE knows when and where it is allowed to transmit PRACH preambles. The UE can transmit PRACH in sub-frame 5, which in this TDD system is a fixed allocation to uplink transmissions. Also, the UE can be configured by broadcast information or preconfigured with timing information of when within a sub-frame it may transmit the preamble.

Based on broadcast information, or preconfigured in the UE according to specification, a PRACH preamble signal is constructed in the UE.

A concept for PRACH preamble detection and round trip estimations is described in U.S. patent application Ser. No. 14/366,324, published as U.S. Publ. No. 2015/0365975A1. This round trip estimator is based on a preamble format with one short sequence which is repeated several times.

In an embodiment, instead of just measuring late and early energy, one can measure the late and early signal in relation to the phase of the rest of the signal. For example, in one embodiment any early/late signal component that is not phase-aligned with the rest of the signal is ignored. This effectively projects the early/late signal to the coherently detected section and can suppress up to half the noise energy. The performance gains are exemplified in FIG. 7 (depicting a comparison between approach described in U.S. patent application Ser. No. 14/366,324, published as U.S. Publ. No. 2015/0365975A1, and embodiments described herein) and FIG. 8 (depicting a comparison of the new method vs LTE PRACH, without any gap).

In one embodiment, instead of a true gap, a pseudo-gap is introduced in the preamble, wherein a signal is transmitted throughout the preamble (i.e., the total received energy is not decreased), but the signal changes character in some respect in a least one time instant within the preamble, thereby allowing early/late detectors to sense the character change. The character change is in one embodiment a change from one synchronization sequence to another.

The embodiments described above can be used together, but are also useful separately.

Figure 7:
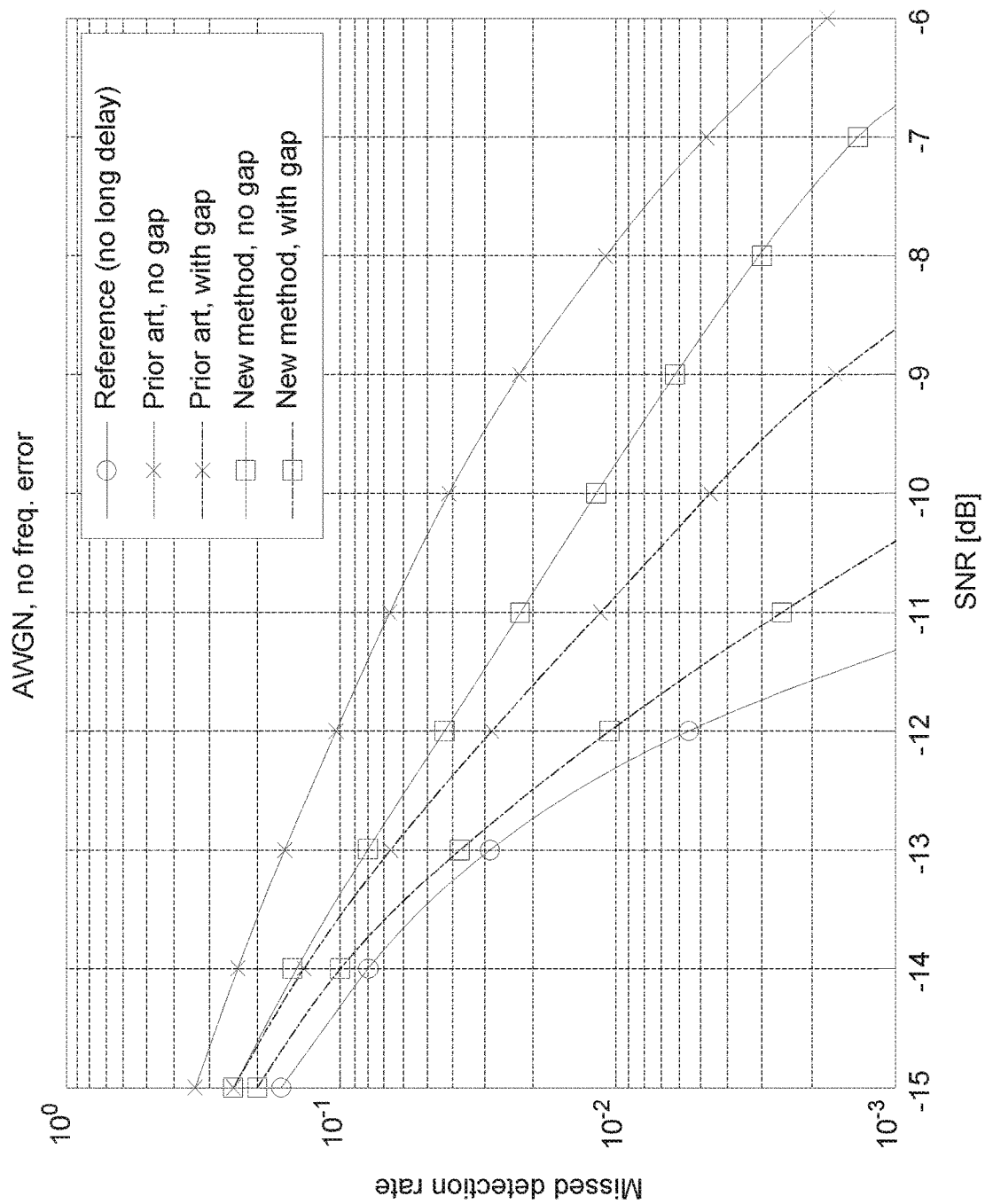
FIG. 7 illustrates a graph showing exemplary performance gains according to some embodiments.

FIG. 7 illustrates performance comparison between prior art and the new method, for additive white Gaussian noise (AWGN) channel and discrimination between delays of 0 vs 1 OFDM symbol, with and without gap.

Figure 8:
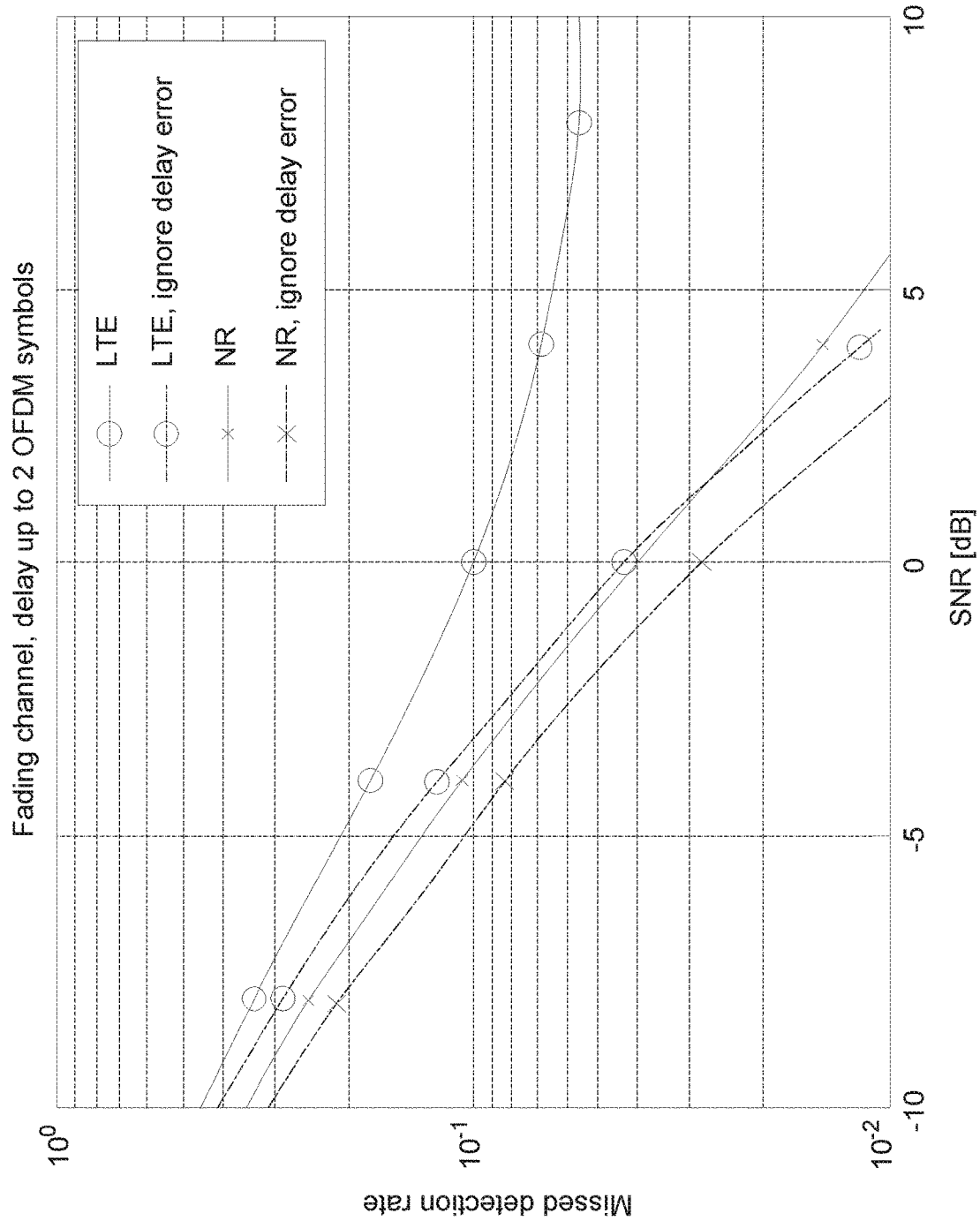
FIG. 8 illustrate a performance comparison between a proposed NR PRACH design and legacy LTE PRACH performance according to some embodiments.

FIG. 8 illustrates a performance comparison between the proposed NR PRACH design (using the new method, but with no gap) and legacy LTE PRACH performance, for fading channel (CDL-C) at 4 GHz and delay up to 2 OFDM symbols, without a gap.

5.0. Detailed Overview

In the following sections, Section 5.1 describes embodiments from U.S. patent application Ser. No. 14/366,324, published as U.S. Publ. No. 2015/0365975A1. Section 5.2 describes in terms of detailed equations the preamble format to which both the embodiments described herein and embodiments from U.S. patent application Ser. No. 14/366, 324 relate. Section 5.3 describes a baseline detector for the preamble format, upon which both embodiments from U.S. patent application Ser. No. 14/366,324, and some embodiments described herein improve. Finally, Sections 5.4-5.5 describe embodiments, using notation and concepts from Sections 5.1-5.3.

5.1. Basic Large Preamble Detector

A detailed description of a preamble structure based on repetitions of a short sequence is given in section 5.2. Here, a number of FFT time windows are defined, each of which forms the inputs to an FFT. Each FFT is followed by a matched filter which is calculated based on a cyclic shift of the short sequence. This cyclic shift is determined based on the expected delay of the short sequence in relation to the position of the FFT time window. The output vectors from the matched filters are added and then processed in an inverse FFT, resulting in a time-domain vector, and the absolute square is calculated for each value of this time-domain vector. By searching for the maximum value in the vector of absolute square values, a first round trip time is estimated. This round trip time estimate equals the sample position in the vector for the maximum value of this absolute square value, divided with the length of the inverse FFT size and multiplied with the length of the short sequence in seconds. Note that this first round trip estimate may be limited by the length in time of the length of the short sequence. A preamble is detected if this maximum value exceeds a predefined threshold value. See section 5.3 for some details of these calculations.

A second step of the preamble detector is used next which has the purpose of identifying if the true round trip time is larger than the length of the short sequence.

Figure 9:
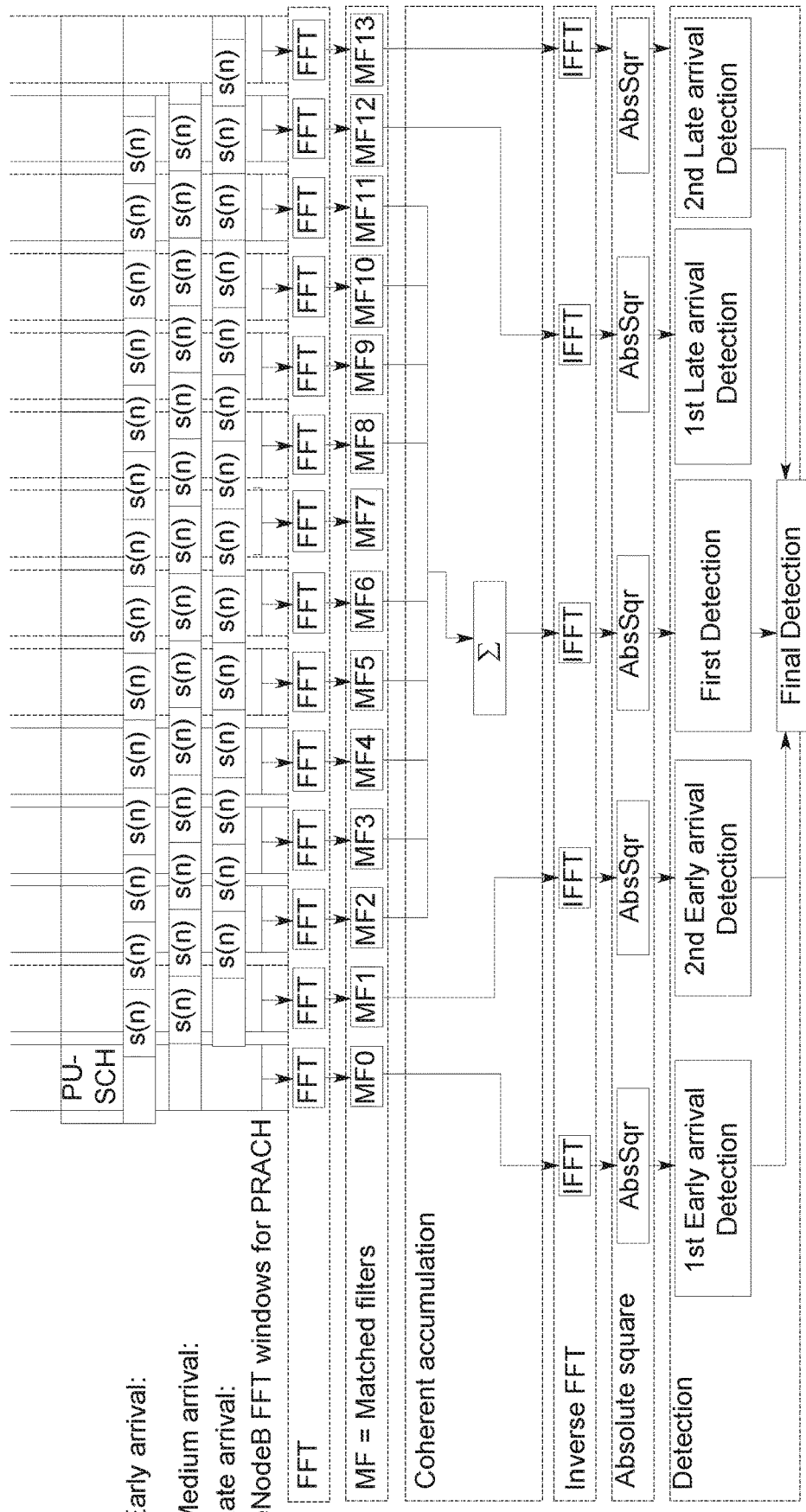
FIG. 9 illustrates a detector that can detect delays up to 2 OFDM symbols according to some embodiments.

In addition to those FFT windows used in the first step, two additional FFT windows are used in FIG. 9, one before and one after the FFT windows used in the first step. Denote the processing corresponding to the first FFT window as an "early arrival detection" and the processing for the last window as a "late arrival detection". The samples in the FFT windows for both the early and late arrival detectors are fed into individual FFTs, matched filters, IFFT, and absolute square operations. Then, a vector with these absolute values, scaled with a noise variance estimator, and finally summed over all antennas and polarizations are calculated. The maximum value of this vector is referred to as a decision variable. An alternative decision variable is to use the sum of all values after the absolute square operation. Yet another alternative method to calculate a decision variable is to add the absolute square values over small intervals of the vector with absolute square values, scaled with a noise variance estimate, and then use the maximum value over several such intervals as decision variable.

If the decision variable for the early arrival detection is larger than the decision variable for the late arrival detection, then the round trip time estimate from the first detection is considered correct. If, on the other hand, the decision variable for the early arrival detection is smaller than the decision variable for the late arrival, then a constant value can be added to the round trip time estimate. This constant value equals the length of the short sequence in seconds.

A gap in the preamble sequence can be configured in order to improve the early and late arrival estimations, for example, see illustration in FIG. 5. Here, the FFT windows to be included in the first detection have been reduced. On the other hand, the numbers of FFT windows included in the early and late detections have been increased.

5.2. Preamble Construction in UE

A short sequence can, e.g., be constructed by using Zadoff-Chu sequences. The $u^{th}$ root Zadoff-Chu sequence is defined (for example, in 3GPP TS 36.211) as:

$$x_u(n) = e^{-j\frac{\pi u n(n+1)}{N_{ZC}}}, 0 \le n \le N_{ZC} - 1 \quad (1)$$

where the length $N_{ZC}$ of the Zadoff-Chu sequence is a prime number. For a PRACH allocation of 72 sub-carriers, the sequence length can, e.g., be set to 71. A time-continuous short random-access signal is defined by $$s_{short}(t) = \beta_{PRACH} \sum_{k=0}^{N_{ZC}-1} \sum_{n=0}^{N_{ZC}-1} x_u(n) \cdot e^{-j\frac{2\pi n k}{N_{ZC}}} \cdot e^{j2\pi(k+k_0)\Delta f t} \quad (2)$$

where $0 \le t < T_{short}$, $\beta_{PRACH}$ is an amplitude-scaling factor in order to conform to the transmit power of PRACH, $k_0 = n_{PRB}^{RA} N_{sc}^{RB} - N_{RB}^{UL} N_{sc}^{RB}/2$, and $\Delta f$ is the sub-carrier spacing. The location in the frequency domain is controlled by the parameter $n_{PRB}^{RA}$; the resource block size in the frequency domain, expressed as a number of subcarriers, is denoted by $N_{sc}^{RB}$, and the uplink bandwidth configuration, expressed in multiples of $N_{sc}^{RB}$, is denoted by $N_{RB}^{UL}$.

A short sequence of the same length as the OFDM symbol is achieved by T_short=1/Δf. For LTE Release 8, this sub-carrier spacing equals Δf=15 kHz (for example, see Table 6.2.3-1 in 3GPP 36.211) such that the length of the short sequence equals T_short=66.6 μs. With a change in subcarrier spacing to, e.g., Δf=75 kHz, then the length of the short symbol equals T_short=13.3 μs.

The preamble to be transmitted is constructed by $$s(t) = s_{short}((t - T_{CP}) \bmod (T_{short}))  \quad (3)$$

where $0 \leq t < T_{SEQ}$, and $T_{CP}$ is the length of a possible cyclic prefix.

By this repetition of the short sequence, each short sequence acts as a cyclic prefix for the next short sequence. Here, the short sequence is repeated 14 times, and succeeded by a part of the short sequence. This last part of the short sequence is inserted at the end such that the preamble covers the whole length of the last receiver FFT window.

5.3. Calculation of Decision Variable

For each antenna a and FFT window p, calculate a DFT or FFT over $N_{FFT}$ samples of the received signal r(n,a) as:

$$R(k, p, a) = \frac{1}{\sqrt{N_{FFT}}} \sum_{n=0}^{N_{FFT}-1} r(n + n_{shift}(p), a) e^{-j2\pi kn/N_{FFT}} \quad (4)$$

for k=0, . . . , $N_{FFT}$−1 and a=0, . . . , $N_a$−1.

The FFT window positions correspond to the distance in time between the start of the subframe and each SC-FDMA or OFDM symbol in uplink. For example, in LTE Release 8, the first cyclic prefix in each slot is 160 samples, while the remaining cyclic prefixes are 144 samples. Each SC-FDMA or OFDM symbol is 2048 samples such that $$n_{shift}(p) = \begin{cases} 160 + (144 + 2048)p & \text{for } p = 0, \ldots, 6 \\ 160 + 16 + (144 + 2048)p & \text{for } p = 7, \ldots, 13 \end{cases}$$

The PRACH preamble in the frequency domain is obtained by extracting sub-carriers corresponding to those sub-carriers used for PRACH, i.e. $N_{seq}$ samples, where $N_{seq} \leq N_{FFT}$ $$R_{PRACH}(k,p,a) = R(k+k_0,p,a) \quad (5)$$

for k=0, . . . , $N_{seq}$−1 and $k_0 = n_{PRB}^{RA} N_{sc}^{RB} - N_{RB}^{UL} N_{sc}^{RB}/2$. Using the same notation as in previous section, and with the use of Zadoff-Chu sequences, then $N_q = N_{ZC}$.

Multiply with a matched filter (of $N_{seq}$ coefficients) in the frequency domain $$C_{MF,v}(k, p, a) = \frac{1}{\sqrt{N_{seq}}} P_v^*(k, p) \cdot R_{PRACH}(k, p, a). \quad (6)$$

This matched filter is constructed from the DFT of known short sequence and the cyclic shift of this short sequence. The cyclic shift corresponds to a frequency-domain rotation with the shift $n_{shift}(p)$:

$$P_v(k, p) = e^{j2\pi k n_{shift}(p)/N_{FFT}} \frac{1}{\sqrt{N_{seq}}} \sum_{n=0}^{N_{seq}-1} x_u(n) e^{-j2\pi kn/N_{seq}}. \quad (7)$$

The output from the matched filters corresponding to the same antenna, but from different FFT windows, can now be coherently added as $$C_v(k, a) = \sum_{p=p_0}^{p_0+P-1} C_{MF,v}(k, p, a) \quad (8)$$

where $p_0$ is the index of the first, out of P, FFT windows included in the PRACH preamble detector.

Now, in order to detect preamble and estimate round trip time, the output from the IFFT can be transformed to the time domain. Calculate an IDFT, of size $N_{IFFT}$, resulting in a correlation vector of length $N_{IFFT}$:

$$C_v(m, a) = \frac{1}{\sqrt{N_{IFFT}}} \sum_{k=0}^{N_{seq}-1} C_v(k, a) e^{j2\pi km/N_{IFFT}} \quad (9)$$

for m=0, . . . , $N_{IFFT}$−1. Selecting $N_{IFFT} > N_{seq}$ corresponds to an interpolation, which can be done in order to increase the resolution of the timing estimation.

A simple estimator of the noise variance $\hat{\sigma}_w^2(a)$ can be formulated as $$\hat{\sigma}_w^2(a) = \sum_{p=p_0}^{p_0+P-1} \sum_{k=0}^{N_{seq}-1} |C_{MF,v}(k, p, a)|^2. \quad (10)$$

As decision variables, the absolute square for each value of the cross-correlation vector is used, normalized with the estimated noise variance $\hat{\sigma}_w^2(i)$, $$\lambda_v(m) = \sum_{a=0}^{N_a-1} \frac{|c_v(m, a)|^2}{\hat{\sigma}_w^2(a)} \quad (11)$$

where a summation over antennas, including polarizations, is included. A preamble detector and round-trip time estimator might be formulated as searching for the maximum value in this vector of normalized absolute squared correlations and comparing this maximum value with a threshold.

Preamble number v is detected if the absolute squared value of this autocorrelation exceeds a threshold $$\lambda_v(m) = \sum_{a=0}^{N_a-1} \frac{|c_v(m, a)|^2}{\hat{\sigma}_w^2(a)} \geq \lambda_{Threshold} \quad (12)$$

for at least one value of m, within the search window of size D. In other words, the preamble with index v is detected if there is an m∈[0,D−1] such that $\lambda_v(m) \geq \lambda_{Threshold}$. This preamble detector threshold $\lambda_{Threshold}$ should be selected with care such that the false detection rate is low without causing a too low detection rate.

A timing estimate follows as the value of m which corresponds to the maximum value of $\lambda_v(m)$, i.e., $$\hat{m} = \arg\max_m \left( \sum_{a=0}^{N_a-1} \frac{|c_v(m,a)|^2}{\hat{\sigma}_w^2(a)} \right) \quad (13)$$

such that the timing error in seconds equals $$\hat{T}_{err} = \hat{m}/(\Delta f \cdot N_{IFFT}) \quad (14)$$

5.4. Improved Large-Delay Detection

In the following, we again write the total delay as $$T_{delay,total} = N \cdot T_{OFDM} + T_{frac} \quad (15)$$

where N is an integer ≥0, $T_{OFDM}$ is the length (duration) of the OFDM symbol DFT, and $0 \leq T_{frac} < T_{OFDM}$.

5.4.1. Basic Algorithm (No Frequency Error or Gap)

In one embodiment, consider the case when there is only one early-arrival detector and one late-arrival detector. The detection method described above can then be said to have a large-delay detection criterion $$\sum_{a=0}^{N_a-1} A(\hat{m},a) |c_{v,E}(\hat{m},a)|^2 < \sum_{a=0}^{N_a-1} A(\hat{m},a) |c_{v,L}(\hat{m},a)|^2 \quad (16)$$

where $c_{v,E}(\hat{m},a)$ is the correlation value from the early-arrival detector for the time offset $\hat{m}$ and spatial branch/antenna branch a, $c_{v,L}(\hat{m},a)$ is the corresponding value from the late arrival detector, and $A(\hat{m},a)$ is a weight factor that may typically be set to $1/\hat{\sigma}_w^2(a)$. If the condition in Eq. (15) is fulfilled, it is assumed that there is a long (≥1 DFT size/duration, i.e. N in (15) equals 1) delay, and if the condition is not fulfilled, it assumed that there is no such long delay (i.e. N equals 0). Another way of expressing this is that there is a decision variable $$\lambda_v(m) = \sum_{a=0}^{N_a-1} A(\hat{m},a) |c_{v,E}(\hat{m},a)|^2 - \sum_{a=0}^{N_a-1} A(\hat{m},a) |c_{v,L}(\hat{m},a)|^2$$

whose sign determines whether there is a long delay or not.

As can be seen, Eq. (15) does not take into account the phase angle of (the complex number) $c_{v,E}(\hat{m},a)$ or $c_{v,L}(\hat{m},a)$, only the absolute value. An aspect of the embodiments described herein is to consider also the phase angle in an appropriate way for better detection reliability (performance).

In one embodiment, the large-delay detection is instead of Eq. (15) based on the condition $$\sum_{a=0}^{N_a-1} A(\hat{m},a) \text{Re}\{c_{v,E}^*(\hat{m},a) c_v(\hat{m},a)\} < \quad (17)$$

$$\sum_{a=0}^{N_a-1} A(\hat{m},a) \text{Re}\{c_{v,L}^*(\hat{m},a) c_v(\hat{m},a)\},$$

or, alternatively expressed, based on the decision variable $$\lambda_v'(m) =$$

$$\sum_{a=0}^{N_a-1} A(\hat{m},a) \text{Re}\{c_{v,E}^*(\hat{m},a) c_v(\hat{m},a)\} - \sum_{a=0}^{N_a-1} A(\hat{m},a) \text{Re}\{c_{v,L}^*(\hat{m},a) c_v(\hat{m},a)\}.$$

(Re{ } denotes real part.) This can be described as "projecting" the correlations $c_{v,E}(\hat{m},a)$ and $c_{v,L}(\hat{m},a)$ on the correlation $c_v(\hat{m},a)$ in the complex plane, and will therefore henceforth sometimes be referred to as detection of "projected correlation", or sometimes "projected energy" for simplicity. Expressed in another way, it can be seen as only measuring the components of $c_{v,E}(\hat{m},a)$ and $c_{v,L}(\hat{m},a)$ that are parallel to (in the complex plane, i.e. phase-aligned with) $c_v(\hat{m},a)$, and discarding any component that is perpendicular.

Intuitively this expression can be motivated as follows: the expression (16) takes advantage of the fact that the early/late desired signal power is (assuming negligible frequency error/offset between receiver and transmitter) rather well phase-aligned with the signal in the larger full window. The alignment becomes increasingly better as the length of the full window in OFDM symbols increases. Assuming that the phase of the full window desired signal can be fairly reliably determined (due to ample sample statistics), one can thus substantially improve effective SNR for detecting early/late desired signal power by only taking into account the signal component of the early/late received signal that is phase-aligned with the full window, i.e., "projecting" the early/late complex correlator output on the full-window complex correlator output.

In some embodiments, the method may be modified by defining partial "medium" windows, e.g., symbols 1-3 and 11-13 in FIG. 8, and shorter early/late windows (0-3 and 11-14 respectively). The projection in (16) may then be done for the early and late windows separately, with respect to their respective partial medium windows. This increases the relative energy difference in the early and late sections and may increase detection performance of N in some cases. Note that $T_{frac}$ is still estimated based on the full medium window.

In other embodiments, $c_{v,E}(\hat{m},a)$ and $c_{v,L}(\hat{m},a)$ are not directly "projected" on $c_v(\hat{m},a)$, but the phase relation still taken into account. For example, one may measure the Euclidean (or other) distance in the complex plane, i.e. use the criterion.

$$\sum_{a=0}^{N_a-1} A(\hat{m},a) |c_{v,E}(\hat{m},a) - c_v(\hat{m},a)|^2 < \quad (18)$$

$$\sum_{a=0}^{N_a-1} A(\hat{m},a) |c_{v,L}(\hat{m},a) - c_v(\hat{m},a)|^2$$

This criterion can also be written as $$\sum_{a=0}^{N_a-1} A(\hat{m},a) \left( |c_{v,E}(\hat{m},a)|^2 - 2\text{Re}\{c_{v,E}^*(\hat{m},a) c_v(\hat{m},a)\} \right) < \quad (18)$$

$$\sum_{a=0}^{N_a-1} A(\hat{m},a) \left( |c_{v,L}(\hat{m},a)|^2 - 2\text{Re}\{c_{v,L}^*(\hat{m},a) c_v(\hat{m},a)\} \right)$$

This criterion reveals a clear similarity with Eq. (16).

In case of possible delays up to two DFT durations (i.e. N=0 or 1 possible in Eq. (15)), one may use two early arrival detectors E1 and E2 and two late arrival detectors L1 and L2, and combine the respective measurements. This is illustrated for the detector of FIG. 8 in U.S. patent application Ser. No. 14/366,324, but the same principle can be used for a phase-considering detector according to embodiments described herein.

FIG. 9 is an illustration of a detector that can detect delays up to 2 OFDM symbols.

For even larger delays (i.e. N>1 possible in Eq. (15)), one may analogously combine values from multiple early and late arrival detectors. The combining can in principle be any function of the outputs of all the measurements in the early/late arrival windows (e.g. the correlators $c_{v,E_n}^*(\hat{m},a)$ and $c_{v,L_n}^*(\hat{m},a)$, where n is an index identifying the different early and late arrival detector windows). However, it has been found that good performance for delays up to two DFT durations can be obtained using a weighted average between correlator output from E1 and E2 on the one hand, and between L1 and L2 on the other hand. In other words, a good large-delay detection criterion can be $$\sum_{a=0}^{N_a-1} A(\hat{m},a) \sum_{n=1}^{N_E} \text{Re}\{w_{E_n} c_{v,E_n}^*(\hat{m},a) c_v(\hat{m},a)\} < \quad (19)$$

$$\sum_{a=0}^{N_a-1} A(\hat{m},a) \sum_{n=1}^{N_L} \text{Re}\{w_{L_n} c_{v,L_n}^*(\hat{m},a) c_v(\hat{m},a)\}$$

where n is again an index identifying the different early and late arrival detectors (correlators) and $w_{E_n}$ and $w_{L_n}$ are early and late arrival weighting factors for the respective windows. If the delay can be more than two OFDM symbols, one may use multiple decision criteria D1, D2, etc. (of the type (19), or with any non-linear combining of the output from the individual detectors) and use them individually or in combination to determine the value of N in Eq. (15).

5.4.2. Frequency Error Compensation

In the presence of a frequency error in the transmitter and/or receiver, i.e., when there is a frequency offset between transmitter and receiver, the phase of the correlator outputs changes from detection window to detection window. In other words, the complex phase of $$c_v(m,p,a) = \frac{1}{\sqrt{N_{IFFT}}} \sum_{k=0}^{N_{seq}-1} C_{MF,v}(k,p,a) e^{j2\pi km/N_{IFFT}} \quad (20)$$

essentially changes linearly with p (if the windows are uniformly spaced, otherwise essentially proportionally to the midpoint times of the windows). This means that the phase of $c_v(\hat{m},a)$ (i.e. the phase of the average $c_v(m,p,a)$ over $p=p_0 \ldots p_0+P-1$) may be a poor estimate of the optimal phase angle to "project" at in the windows E1, E2, L1, L2, etc. (note that $c_v(m,p_{En},a) \equiv c_{v,En}(m,a)$ and $c_v(m,p_{Ln},a) \equiv c_{v,Ln}(m,a)$). There are different ways to make a better estimate of the optimal phase angles in the E1, E1, L1, L2, etc., windows. One way is to make an estimate of the frequency offset, and then compensate for it by adjusting the phase of $c_v(m,a)$ or $c_{v,Ln}(m,a)$ and $c_{v,En}(m,a)$) before performing the projection of Eq. (16), (17), (18), or (19). The adjustment can e.g. be of the type:

$$c_{v,En}'(m,a) = c_{v,En}(m,a) \cdot \exp(j\Delta\varphi_n(\hat{m}))$$

(and analogously for $c_{v,Ln}(m,a)$, $c_v(m,a)$ etc.), where $\Delta\varphi_n(\hat{m}) = 2\pi f_{err}(t_{ref}-t_n)$ with $t_n$ being the midpoint of the window n, and $t_{ref}$ is some reference point in time (arbitrarily chosen, or set equal to, e.g. some $t_n$). In the preceding description, it was assumed that there was a single $c_v(m,a)$ used to determine $T_{frac}$, but in the more general case, there may be multiple groups of windows leading to multiple $c_v(m,a)$.

Various embodiments of estimating the frequency offset are outlined in the following subsections.

5.4.2.1. Frequency Offset Estimation Method 1

In one embodiment, a method to estimate a frequency offset consists in using the outputs of individual correlators $c_v(m,p,a)$ (or possibly the averaged output of groups of such correlators, but not all) and try different frequency offset hypotheses to find the frequency that best fits the correlator values (i.e., best captures the rotation of the complex values from window to window):

$$\delta\hat{f} = \arg\max_{\delta f} \left\{ \text{abs}\left( \sum_{p=p_0}^{p_0+P-1} c_v(m,p,a) e^{j2\pi\delta fn_{shift}(p)/N_{IFFT}} \right) \right\}$$

In one embodiment, if time windows p are uniformly spaced in time, an efficient way of achieving this could be to take a DFT of the correlator values $c_v(m,p,a)$ to obtain the frequency domain representation and then search for a peak in that representation. The position of the peak indicates the frequency offset.

5.4.2.2. Frequency Offset Estimation Method 2

In an embodiment, a method to estimate a frequency offset is similar to the method described above in Section 5.4.2.1, but attempts to fit a rotation to the correlator outputs for $p=p_0 \ldots p_0+P-1$ jointly with the correlator output for either early or late arrival windows. This means twice as many hypotheses to try (one set including early but not late window, another including late but not early window), and the result not only gives an estimate of the frequency offset, but also a direct indication of whether the early or late arrival detector contained more energy.

5.4.2.3. Frequency Offset Estimation Method 3

In an embodiment, another method is described with highly reduced computational complexity which has still been found to give good performance. This method may be particularly useful with the receiver structure outlined in [R1-1609672] for N_NC=2. There are then two correlator outputs from the baseline detector, henceforth referred as $c_{v,B1}(m,a)$ and $c_{v,B2}(m,a)$ (corresponding to two window groups B1 and B2, respectively). The frequency error can be estimated from these two correlations as $$\delta\hat{f} = \frac{\arg(c_{v,B2}(m,a)/c_{v,B1}(m,a))}{j2\pi\Delta T_{B2,b1}} \quad (21)$$

where $\Delta T_{B2,B1}$ is the time difference between the midpoint of the B1 group and the midpoint of the B2 group.

5.4.3. Supplementary Description

The following is a brief complementary description of a long-delay detector according to embodiments described herein.

In some embodiments, delays up to the length of one PRACH OFDM symbols can be detected by frequency domain matched filters. However, this receiver structure results in a delay ambiguity when the delay exceeds the length of the PRACH OFDM symbol. A modified PRACH preamble detector may then be used. An example of a PRACH preamble detector for handling large delays is illustrated in more detail in FIG. 10 below. Here, a detector is included which compares the received signal in first and last FFT time windows resulting in a decision if delays are smaller or larger than the length of the PRACH OFDM symbol. This decision can then be combined with a delay estimator resulting in a delay estimate with high time resolution and with possible delays larger than one PRACH OFDM symbol.

In more detail, let $$\hat{m} = \arg\max_m (|c_A(m)|^2 + |c_B(m)|^2) \quad \hat{T}_{delay} = \hat{m}/(\Delta f \cdot N_{IFFT}),$$

where $\Delta f$ is the subcarrier spacing. The decision whether the delay is smaller or large than on symbol can in principle be taken based on a comparison of early-arrival energies $|c_1(\hat{m})|^2$ and $|c_2(\hat{m})|^2$ versus late-arrival energies $|c_{13}(\hat{m})|^2$ and $|c_{14}(\hat{m})|^2$. However, better performance can be obtained by basing the decision only on the signal components of $|c_n(m)|^2$, n=1, 2, 13, 14, that are in phase with $c_A(\hat{m})$ and $c_B(\hat{m})$. In other words, projected early-arrival and late-arrival energies can be estimated as $$P_{early} = \text{Re}\{w_1(\hat{m})c_1{}^*(\hat{m})\bar{c}_1(\hat{m}) + w_2(\hat{m})c_2{}^*(\hat{m})\bar{c}_2(\hat{m})\}$$

and $$P_{late} = \text{Re}\{w_{13}(\hat{m})c_{13}{}^*(\hat{m})\bar{c}_{13}(\hat{m}) + w_{14}(\hat{m})c_{14}{}^*(\hat{m})\bar{c}_{14}(\hat{m})\},$$

where $w_n(\hat{m})$ are real-valued weight factors calibrated using an AWGN channel (incl. different delays) and $\bar{c}_n(\hat{m}) = \frac{1}{2}\lfloor\exp(j\Delta\varphi_{A,n}(\hat{m}))c_A(\hat{m}) + \exp(j\Delta\varphi_{B,n}(\hat{m}))c_B(\hat{m})\rfloor$ represents the signals A and B with phase offsets $\Delta\varphi_{x,n}(\hat{m}) = 2\pi f_{err}(t_n - t_x)$ compensating for any frequency offset $f_{err}$ between UE and TRP ($t_n$ and $t_x$ can be taken as the midpoints of the respective window or group of windows). Note that $f_{err}$ need only be estimated (e.g. from the phase difference between $c_A(\hat{m})$ and $c_B(\hat{m})$) after the optimal $\hat{m}$ has already been found, i.e. the extra computational complexity is minimal.

Figure 10:
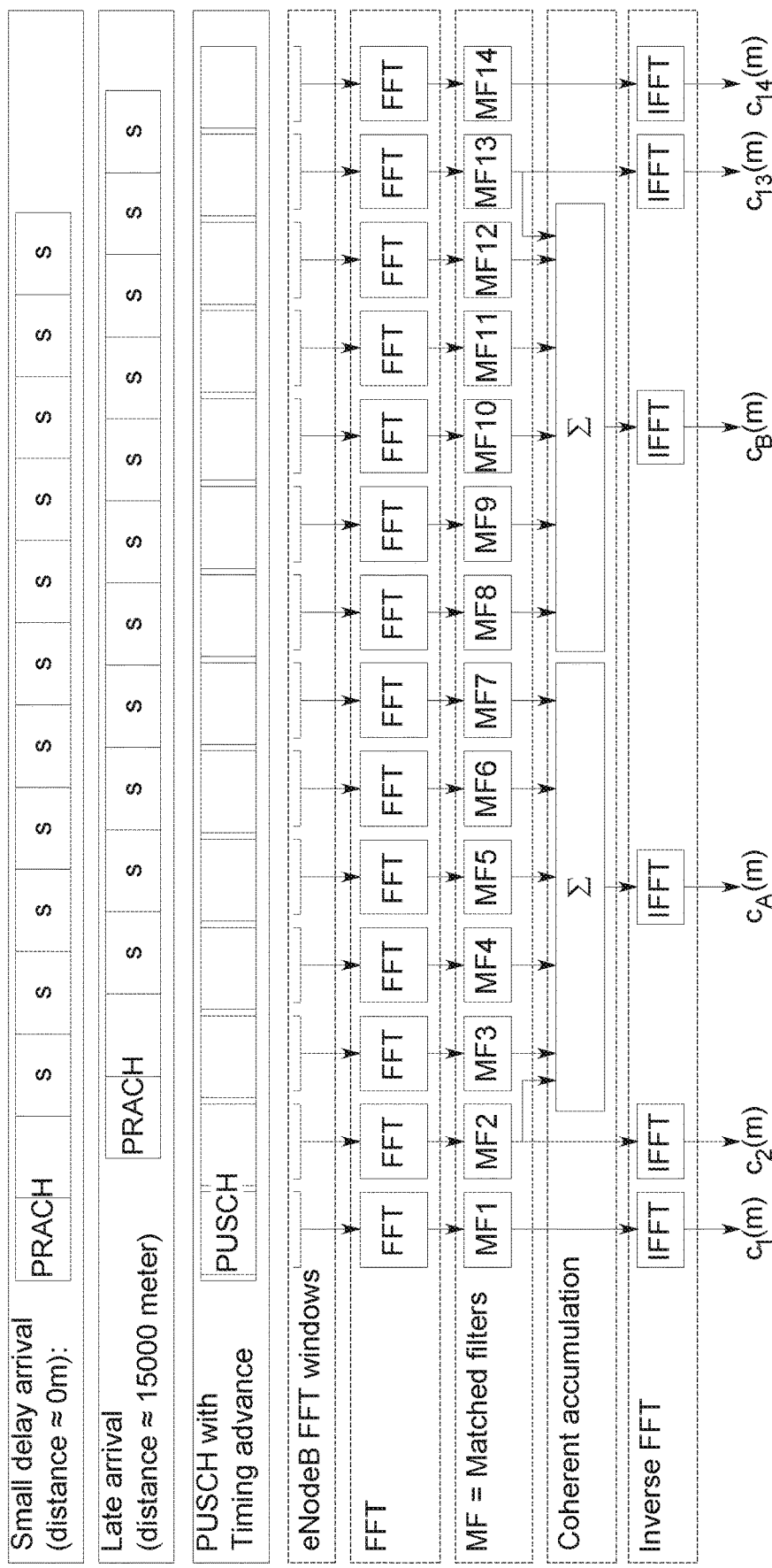
FIG. 10 illustrates a large delay PRACH preamble detector outline according to some embodiments.

FIG. 10 illustrates a large delay PRACH preamble detector outline.

5.4.4. Detection with Gap

As explained in U.S. patent application Ser. No. 14/366,324, a gap can improve detection performance as it gives more opportunities to measure early and late arrival. According to embodiments, a new algorithm that takes phases into account can fully analogously also be applied when there is one or multiple gaps. The gains are illustrated in FIG. 10.

5.5. Pseudogap

As explained above and in U.S. patent application Ser. No. 14/366,324, a gap in the preamble transmission can improve early and late arrival detection. However, a gap may cause the baseline detector (the output of which is also important as input to the long-delay detector) to receive less energy and hence perform worse. (In addition to receiving less energy, the detector may also for some delays include in its correlation process some time segments that do not contain signal energy but only interference and/or noise, which further decreases the effective sign-to-interference-plus-noise ratio (SINR) at the detector.)

Figure 11:
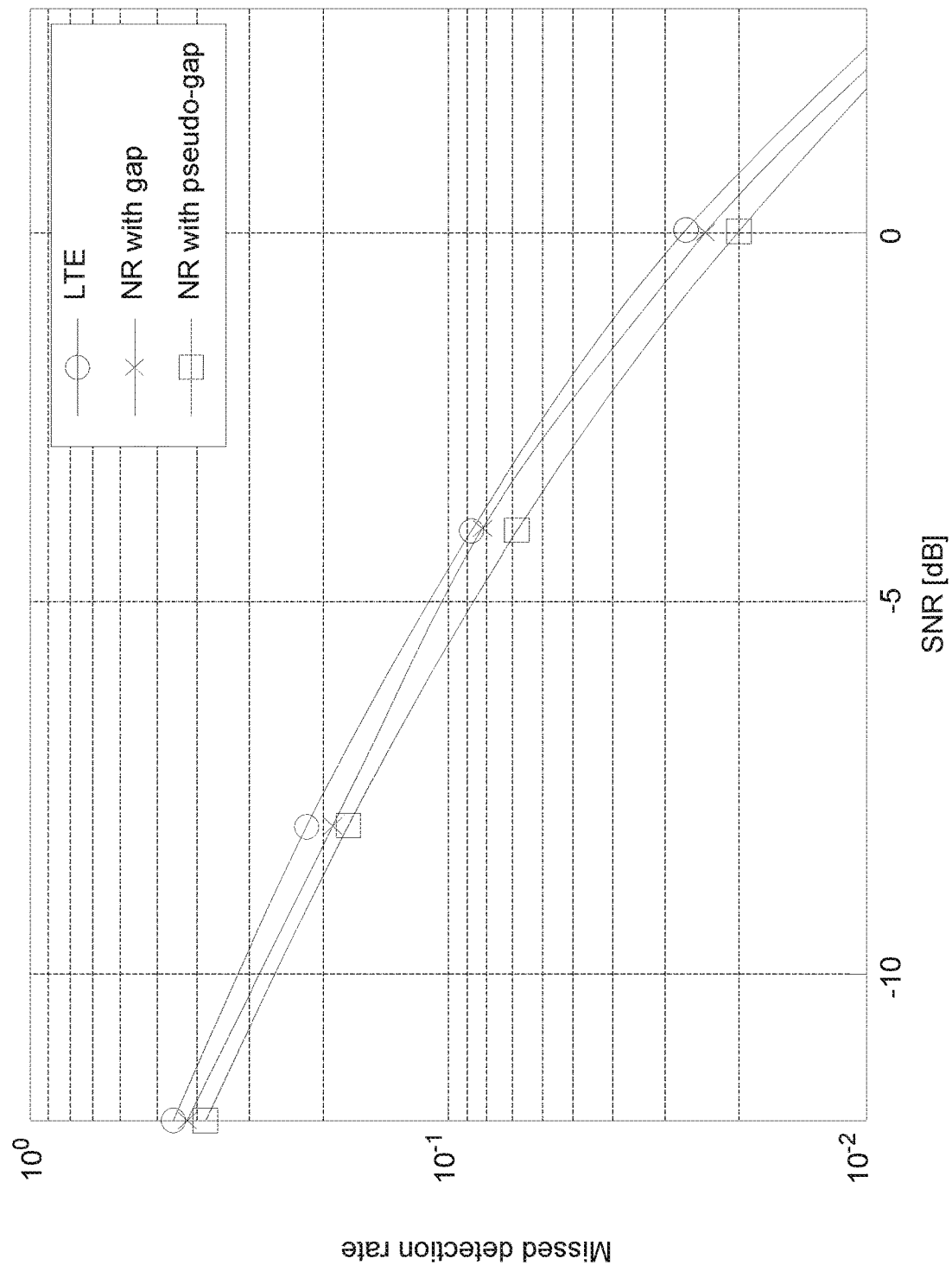
FIG. 11 illustrates the gain from a pseudogap compared to a normal (real) gap according to some embodiments.

In one embodiment, an approach for improving baseline detector performance is to introduce a pseudogap, by which is here meant a property of the signal that gives the same or similar advantages as a real gap, but without actually interrupting transmission (and possibly without even reducing the signal power), at least not for any prolonged time such as the duration of a DFT duration. As is shown in FIG. 11, the performance of the basic detector (no long-delay detection) is improved as compared to a real gap. Two possible ways of achieving this are described in the following.

FIG. 11 illustrates the gain from a pseudogap compared to a normal (real) gap.

5.5.1. Pseudogap Type 1

Figure 12:
FIG. 12 illustrates a pseudogap according so some embodiments.

In one embodiment, the preamble is split into two parts, with the (repeated) synchronization sequence being different in the first part (typically half or somewhat less than half) of the preamble and the second part (see FIG. 12). The early arrival detectors in the middle can look for the part 2 sequence, whereas the late arrival detectors can look for the part 1 sequence. If the cross-correlations between the two sequences are good, this can yield equally good large-delay detection performance as a real gap (since a correlator searching for the sequence of the first part will not result in any detection peak if only the sequence of the second part is present in its window). Note that the point of shift from part 1 to part 2 ($T_{split}$ in the figure) need not be exactly at a sequence boundary.

FIG. 12 illustrates a pseudogap.

5.5.2. Pseudogap Type 2

In an embodiment, another possibility of achieving a pseudogap is to let the synchronization sequences in part 2 be identical to those of part 1 except for a (possibly quite small) time offset $\Delta T_{gap}$ e.g. one or a few sequence elements $\Delta m_{gap}$ (e.g., $\frac{1}{72}$ of a DFT if the correlation sequence length is 72).

The time offset can be obtained, e.g., (i) by inserting a small guard interval at the point $T_{split}$, or (ii) by omitting the transmission of one (or more) sequence element at point $T_{split}$, or (iii) by repeating one (or more) element(s), or (iv) by inserting a short cyclic prefix at $T_{split}$, or (v) by inserting any dummy element (may affect correlation accuracy somewhat, but probably negligible).

In some embodiments, the inserted or removed segment can be short; however, the inserted or removed segment generally is larger than the channel delay spread in the environment for best performance (note that this delay spread is typically much shorter than the propagation delay and RTT). The baseline receiver correlators B1 and B2 are to be aware of the presence and size of the time offset and be adjusted accordingly, i.e. the detection metric can combine peaks at position m in B1 with a peaks at position $m + \Delta m_{gap}$ in B2.

Now suppose the basic correlators B1 and B2 found a peak at delay $\hat{m}_1$ in part 1 and $\hat{m}_2 = \hat{m}_1 + \Delta m_{gap}$ in part 2. Then the late arrival detectors at the beginning of the pseudogap can then search for a correlation peak at $\hat{m}_1$, whereas the early arrival detectors at the end of the pseudogap can search for a correlation peak at $\hat{m}_2$.

6.0. Example Embodiments

Figure 13:
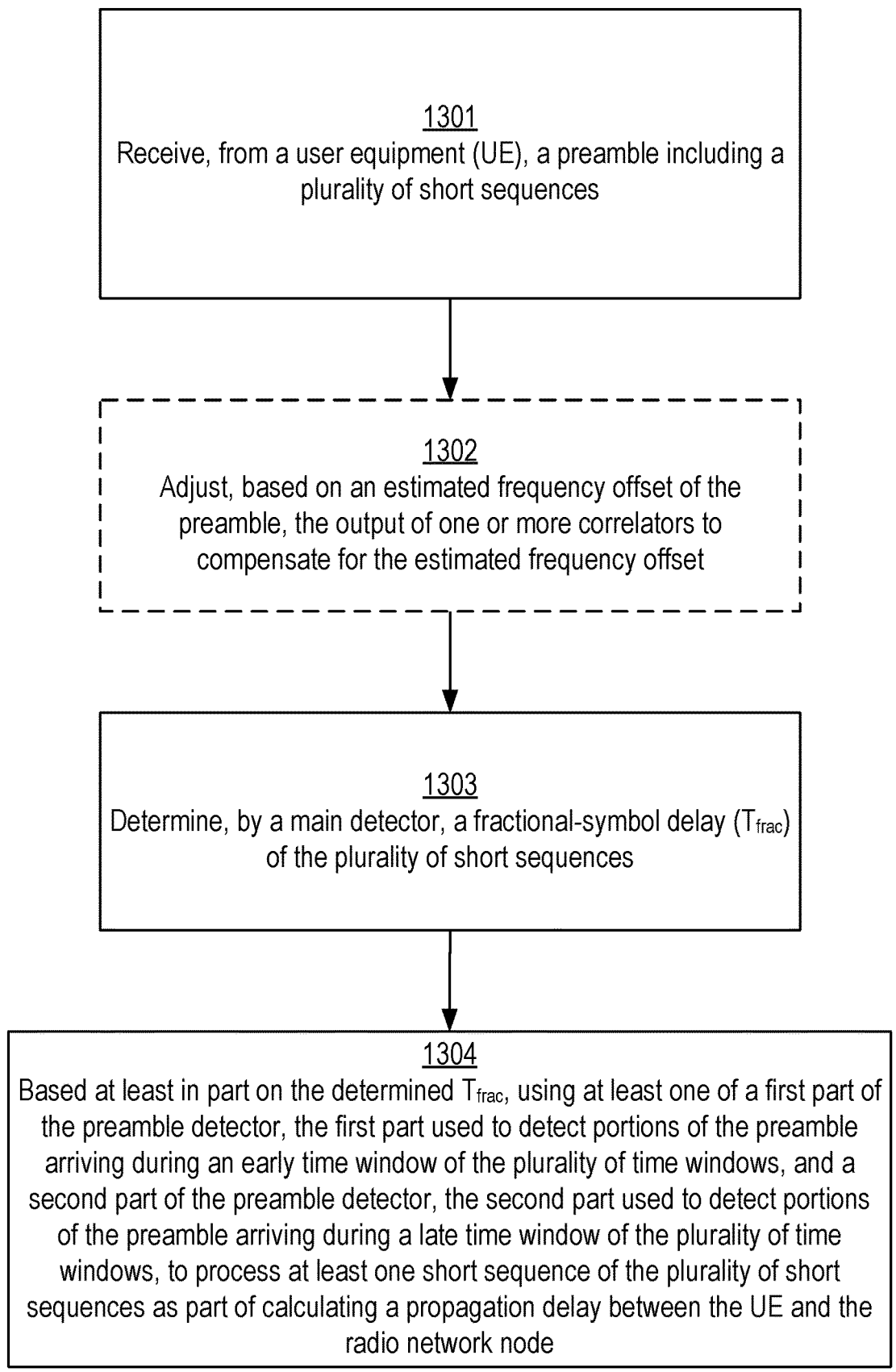
FIG. 13 is a flow-type diagram illustrating operations for processing a preamble sequence used to determine a timing advance based on a calculated propagation delay between a user equipment (UE) and a radio network node in a wireless communication system according to some embodiments.

FIG. 13 is a flow-type diagram illustrating operations for processing a preamble used in a wireless communication system according to some embodiments.

At block 1301, a radio network node receives, from a user equipment (UE), the preamble including a plurality of short sequences. In one embodiment, each of the short sequences has a same time duration as an orthogonal frequency division multiplexing (OFDM) symbol used to carry data traffic in the wireless communication system. In one embodiment, the radio network node receives the preamble on a physical random access control channel (PRACH). In one embodiment, an early-arrival detector includes a plurality of early-arrival detectors, and wherein a late-arrival detector includes a plurality of late-arrival detectors.

In one embodiment, the preamble received by the radio network node is split into two portions, wherein a first of the two portions was transmitted by the UE using a first transmission characteristic, and wherein a second of the two portions was transmitted by the UE using a second transmission characteristic that is different from the first transmission characteristic. In one embodiment, the difference between the first transmission characteristic and the second transmission characteristic is based on a predefined time offset inserted by the UE between the first portion and the second portion. In one embodiment, the time offset is generated by one or more of: inserting a small guard interval between the portions, omitting the transmission of one or more sequence elements, repeating one or more sequence elements, inserting a short cycle prefix between the two portions, and inserting a dummy element between the two portions.

At block 1302, optionally, the radio network node adjusts, based on an estimated frequency offset of the preamble, the output of one or more correlators to compensate for the estimated frequency offset. In one embodiment, the frequency offset is estimated based on one or more of: output from one or more correlators, an averaged output of one or more groups of correlators.

At block 1303, the radio network node determines, by a main detector, a fractional-symbol delay ($T_{frac}$) of the plurality of short sequences. In one embodiment, the $T_{frac}$ is one of a plurality of computed $T_{frac}$ candidates, and calculating the propagation delay between the UE and the radio network node is based on the plurality of computed $T_{frac}$ candidates.

At block 1304, based on the determined $T_{frac}$, the radio network node uses at least one of a first part of the preamble detector, the first part used to detect portions of the preamble arriving during an early time window of the plurality of time windows, and a second part of the preamble detector, the second part used to detect portions of the preamble arriving during a late time window of the plurality of time windows, to process at least one short sequence of the plurality of short sequences as part of calculating a propagation delay between the UE and the radio network node. In one embodiment, the first part of the preamble detector includes a plurality of early-arrival detectors, and the second part of the preamble detector includes a plurality of late-arrival detectors.

In some embodiments, the processing of the at least one short sequence to calculate the propagation delay comprises processing received sample groups corresponding to hypothetical time windows whose length is equal to the length of a short sequence, even if such short sequence is not actually present. For example, a base station generally may not know if a preamble is present until after the detection process. In an embodiment, when an actual short sequence is received, the base station can determine the fractional delay $T_{frac}$.

In one embodiment, based on the calculated propagation delay, the radio network node determines a timing advance. For example, the UE can use the timing advance to adjust the timing of a future transmission to the radio network node. The radio network node can transmit the timing advance to the UE for use by the UE.

In one embodiment, the main detector determines a phase of the plurality of short sequences and, based at least in part on the determined phase, the radio network nodes uses at least one of an early-arrival detector and a late-arrival detector to process at least one short sequence of the plurality of short sequences as part of calculating a propagation delay between the UE and the radio network node.

Figure 14:
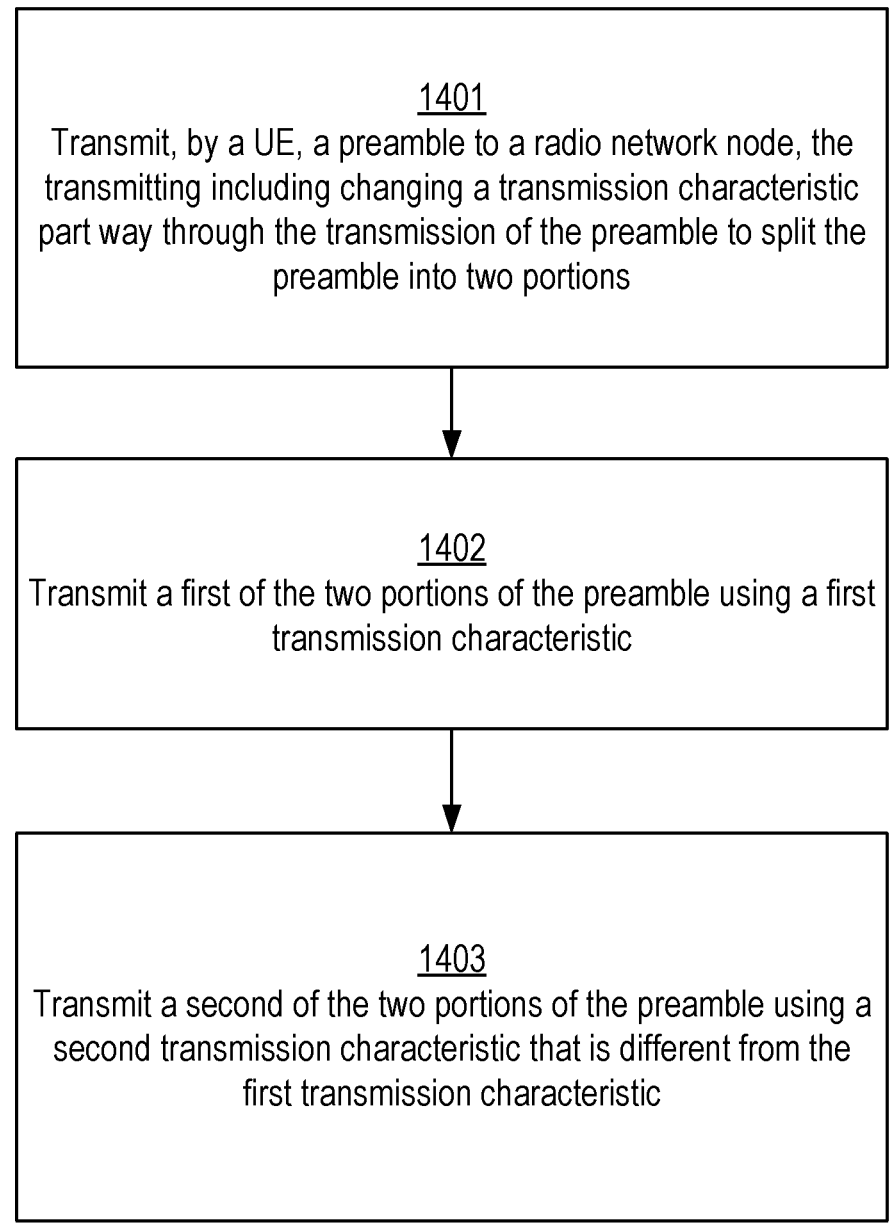
FIG. 14 is a flow-type diagram illustrating operations for a UE transmitting a preamble sequence including a pseudogap according to some embodiments.

FIG. 14 is a flow-type diagram illustrating operations in a user equipment (UE) for transmitting a preamble, wherein the preamble is comprised of a plurality of short sequences.

At block 1401, the UE transmits the preamble to a radio network node, the transmitting including changing a transmission characteristic part way through the transmission of the preamble to split the preamble into two portions. In one embodiment, the change in the transmission characteristic is based on at least one predefined transmission characteristic change. In one embodiment, the preamble allows the radio network node to perform early and late arrival detection of the preamble and to determine therefrom a propagation delay between the UE and the radio network node. In one embodiment, the preamble is transmitted on a physical random access control channel (PRACH). In one embodiment, the preamble includes a plurality of short sequences, each of the short sequences having a same time duration as an orthogonal frequency division multiplexing (OFDM) symbol used to carry data traffic in a wireless communication system.

At block 1402, the transmitting includes transmitting a first of the two portions of the preamble using a first transmission characteristic.

At block 1403, the transmitting further includes transmitting a second of the two portions of the preamble using a second transmission characteristic that is different from the first transmission characteristic.

In one embodiment, the preamble includes a plurality of short sequences, each of the short sequences having a same time duration as an orthogonal frequency division multiplexing (OFDM) symbol used to carry data traffic in the wireless communication system.

In one embodiment, the first of the two portions includes a first repeated synchronization sequence and the second of the two portions includes a second repeated synchronization sequence, and the first and second transmission characteristics differ in that the first repeated synchronization sequence and the second repeated synchronization sequence are different.

In one embodiment, changing the transmission characteristic part way through the transmission includes generating a time offset between the two portions. In one embodiment, the time offset is generated by one or more of: inserting a small guard interval between the two portions, omitting the transmission of one or more sequence elements, repeating one or more sequence elements, inserting a short cycle prefix between the two portions, and inserting a dummy element between the two portions.

In one embodiment, the UE receives a timing advance from the radio network node that was based upon the determined propagation delay, and the UE adjusts a future transmission to the radio network node based on the received timing advance.

In one embodiment, a signal power used during a time between the transmission of the first and second portions of the preamble is not lower than a signal power used to transmit the first and second portions.

Figure 15:
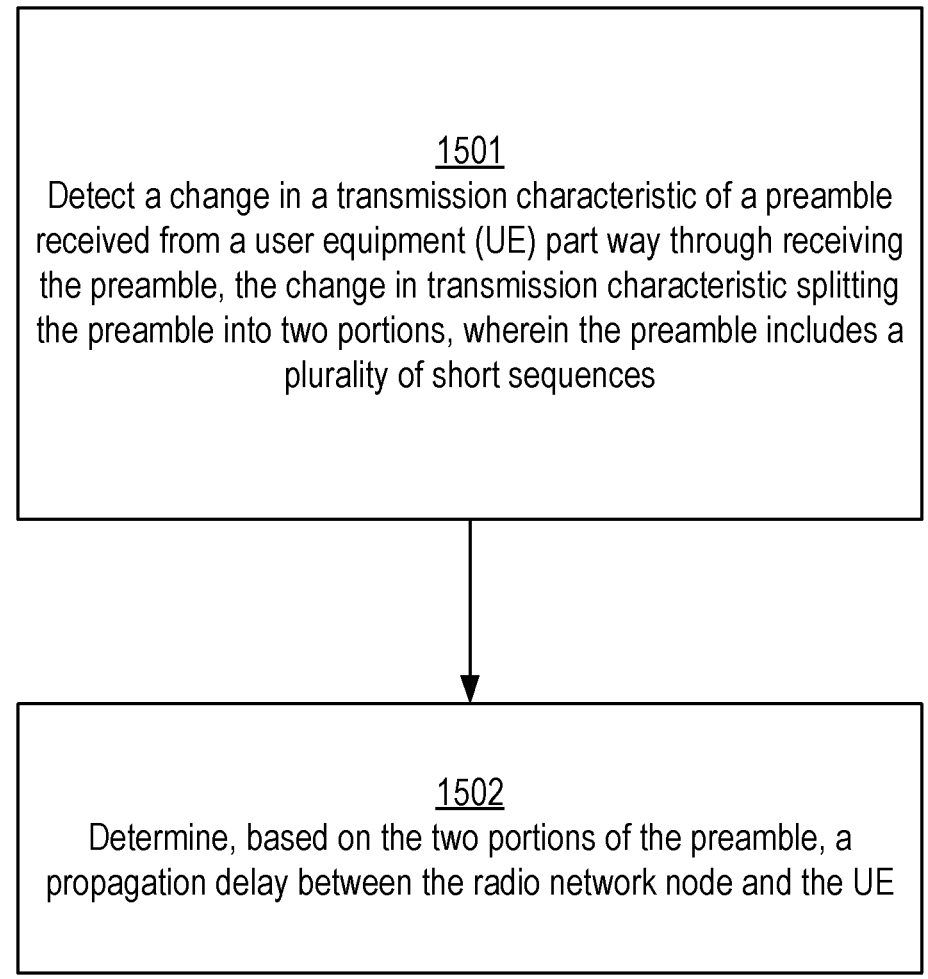
FIG. 15 is a flow-type diagram illustrating operations for a radio network node processing a preamble sequence including a pseudogap according to some embodiments.

FIG. 15 is a flow-type diagram illustrating operations in a radio network node for processing a preamble including a pseudogap according to embodiments.

At block 1501, the radio network node detects a change in a transmission characteristic of a preamble received from a user equipment (UE) part way through receiving the preamble, the change in transmission characteristic splitting the preamble into two portions, wherein the preamble includes a plurality of short sequences. In one embodiment, each of the short sequences having a same time duration as an orthogonal frequency division multiplexing (OFDM) symbol used to carry data traffic in the wireless communication system.

At block 1502, the radio network node determines, based on the two portions of the preamble, a propagation delay between the radio network node and the UE.

In one embodiment, the radio network node further determines, based on the calculated propagation delay, a timing advance, where the UE uses the timing advance to adjust the timing of a future transmission to the radio network node. The radio network node can transmit the timing advance to the UE.

Figure 32:
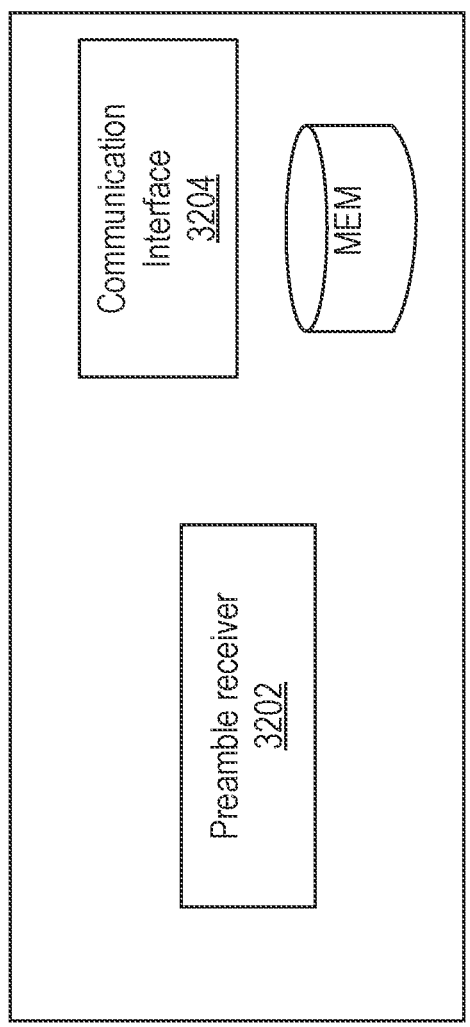
FIG. 32 illustrates a network node according to some embodiments.

FIG. 32 in the accompanying figures shows a network node 3201 comprising a communication interface 3204 and a preamble receiver 3202 according to embodiments described herein. With reference to FIG. 1, there is further disclosed herein a preamble transmitter and preamble receiver system comprising at least one wireless device 102 and at least network node 101 comprising one preamble receiver according to the present teaching.

Figure 33B:
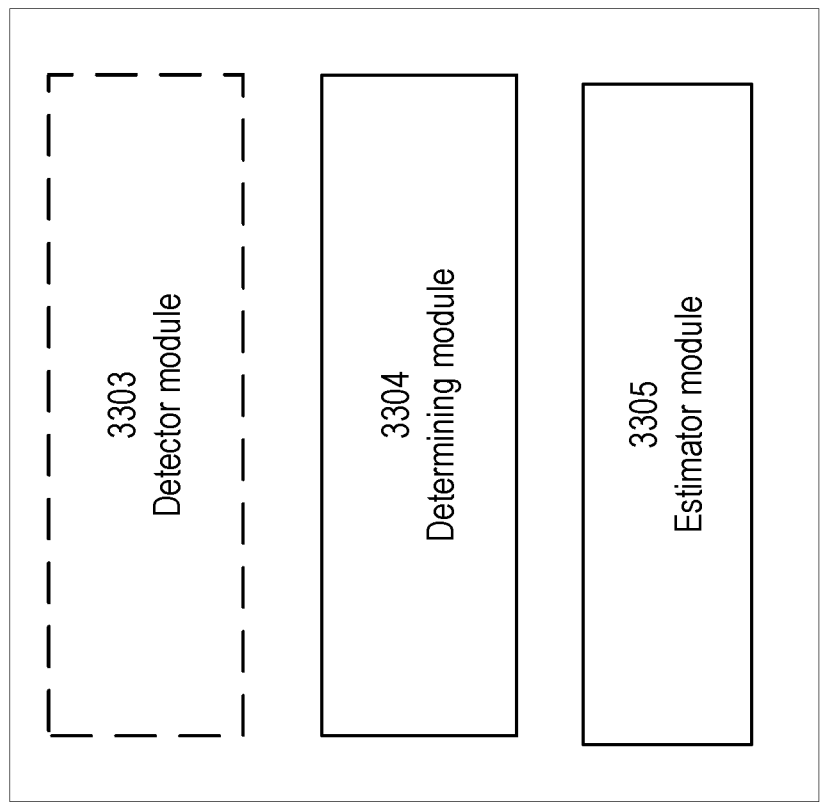
FIG. 33B illustrates a preamble receiver according to some embodiment.
Figure 33A:
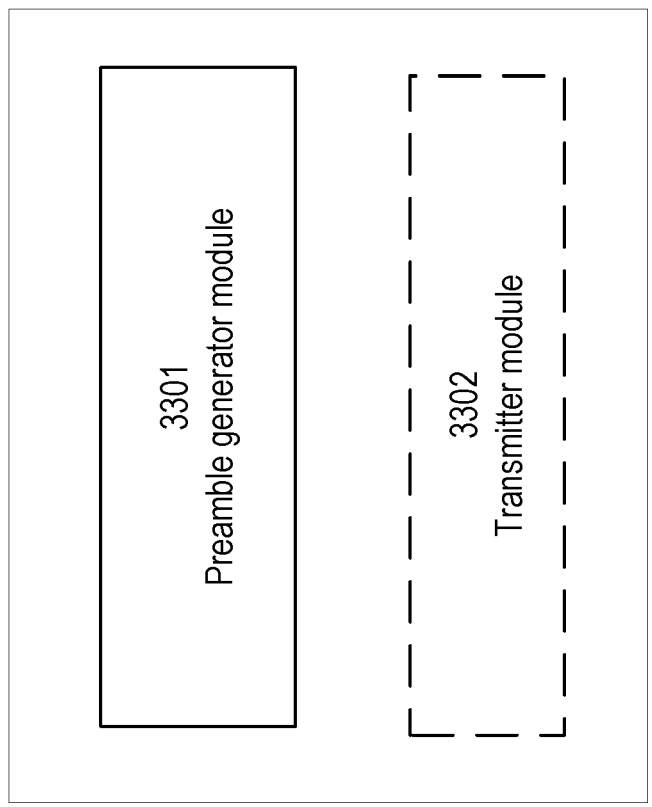
FIG. 33A illustrates a wireless device according to some embodiments.

FIG. 33A in the accompanying figures shows a wireless device for processing a preamble, the wireless device comprising a preamble generator module 3301 configured to generate one or more identical short sequences s[n], each of the short sequences having a same time duration T as an orthogonal frequency division multiplexing (OFDM) symbol used for carrying data traffic in a radio access network 100 of the wireless device, and an optional transmitter module 3302 configured to transmit the preamble sequence to a preamble receiver in the radio access network 100 of the wireless device 102.

FIG. 33B shows a preamble receiver for processing a preamble sequence comprising one or more identical short sequences s[n] according to the embodiments described herein. In an embodiment, the preamble receiver comprises: an optional detector module 3303 configured to detect the preamble in a received radio signal based on FFT processing of the received radio signal, a determining module 3304 configured to determine a fractional-symbol delay of the short sequence s[n], and an estimator module 3305 configured to estimate an arrival time of the preamble sequence based on the determined fractional-symbol delay.

Figure 34:
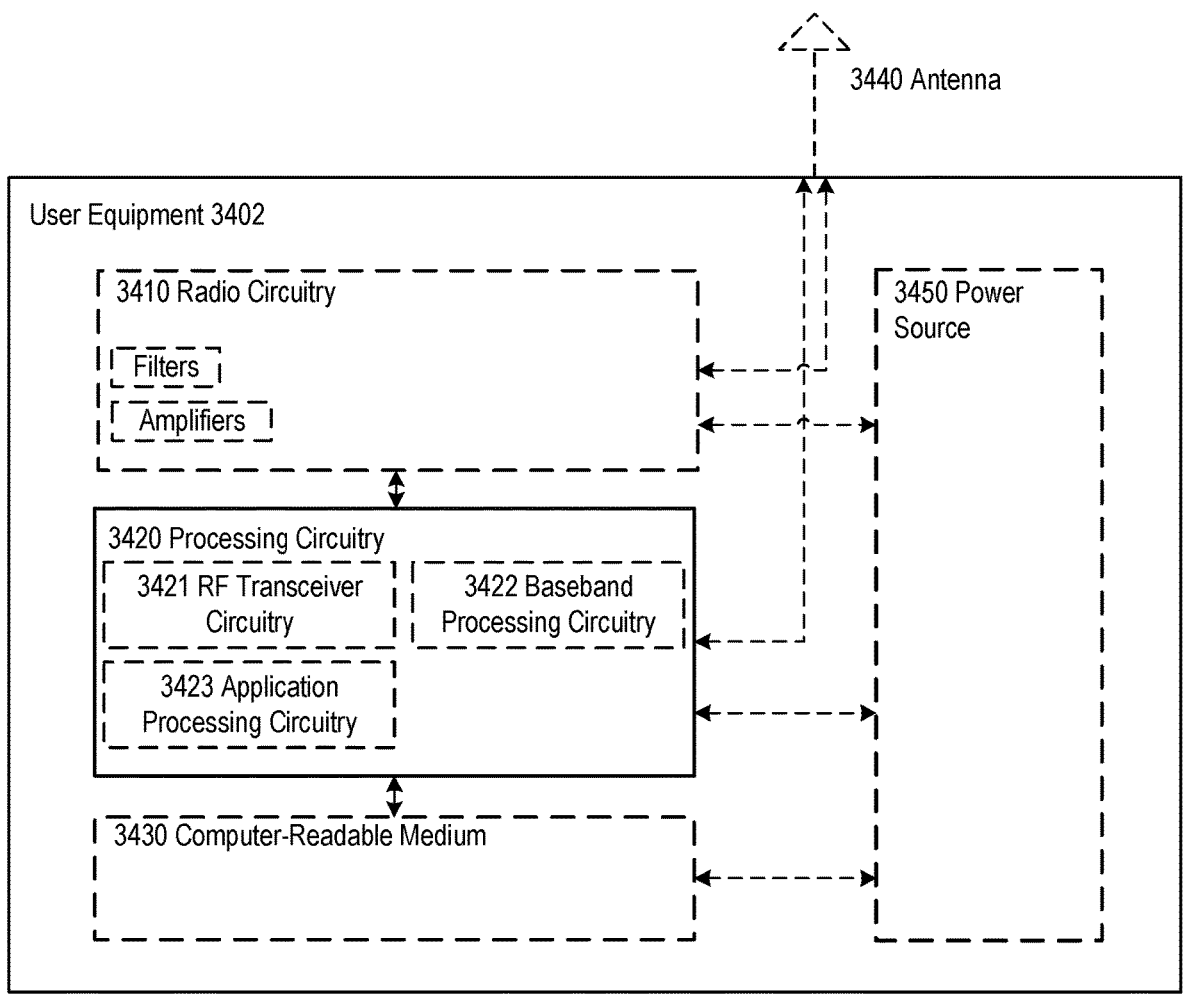
FIG. 34 illustrates a user equipment according to some embodiments.

Additional details of a user equipment 3402 are shown in relation to FIG. 34. As shown in 34, the example user equipment 3402 includes an antenna 3440, radio circuitry (e.g. radio front-end circuitry) 3410, processing circuitry 3420, and the user equipment 3402 may also include a memory 3430. The memory 3430 may be separate from the processing circuitry 3420 or an integral part of processing circuitry 3420. Antenna 3440 may include one or more antennas or antenna arrays, and is configured to send and/or receive wireless signals, and is connected to radio circuitry (e.g. radio front-end circuitry) 3410. In certain alternative embodiments, user equipment 3402 may not include antenna 3440, and antenna 3440 may instead be separate from user equipment 3402 and be connectable to user equipment 3402 through an interface or port.

The radio circuitry (e.g. radio front-end circuitry) 3410 may comprise various filters and amplifiers, is connected to antenna 3440 and processing circuitry 3420, and is configured to condition signals communicated between antenna 3440 and processing circuitry 3420. In certain alternative embodiments, user equipment 3402 may not include radio circuitry (e.g. radio front-end circuitry) 3410, and processing circuitry 3420 may instead be connected to antenna 3440 without front-end circuitry 3410.

Processing circuitry 3420 may include one or more of radio frequency (RF) transceiver circuitry, baseband processing circuitry, and application processing circuitry. In some embodiments, the RF transceiver circuitry 3421, baseband processing circuitry 3422, and application processing circuitry 3423 may be on separate chipsets. In alternative embodiments, part or all of the baseband processing circuitry 3422 and application processing circuitry 3423 may be combined into one chipset, and the RF transceiver circuitry 3421 may be on a separate chipset. In still alternative embodiments, part or all of the RF transceiver circuitry 3421 and baseband processing circuitry 3422 may be on the same chipset, and the application processing circuitry 3423 may be on a separate chipset. In yet other alternative embodiments, part or all of the RF transceiver circuitry 3421, baseband processing circuitry 3422, and application processing circuitry 3423 may be combined in the same chipset. Processing circuitry 3420 may include, for example, one or more central processing units (CPUs), one or more microprocessors, one or more application specific integrated circuits (ASICs), and/or one or more field programmable gate arrays (FPGAs).

The user equipment 3402 may include a power source 3450. The power source 3450 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 3410, processing circuitry 3420, and/or memory 3430. The power source 3450, battery, power supply circuitry, and/or power management circuitry are configured to supply user equipment 3402, including processing circuitry 3420, with power for performing the functionality described herein.

Figure 35:
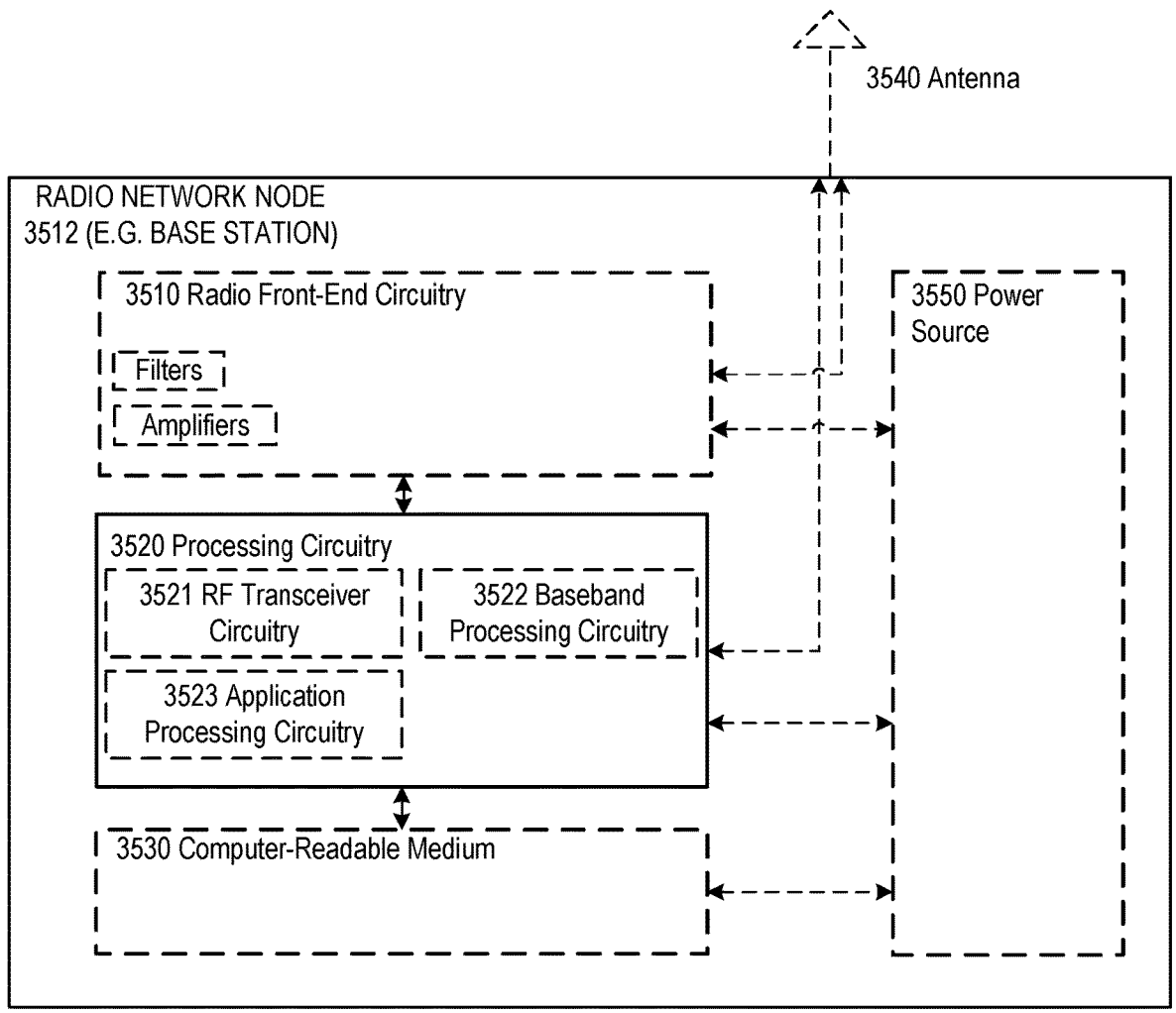
FIG. 35 illustrates a radio network node according to some embodiments.

Additional details of a radio network node 3512 are shown in relation to FIG. 35. As shown in FIG. 35, the example radio network node 3512 includes an antenna 3540, radio circuitry (e.g. radio front-end circuitry) 3510, processing circuitry 3520, and the radio network node 12 may also include a memory 3530. The memory 3530 may be separate from the processing circuitry 3520 or an integral part of processing circuitry 3520. Antenna 3540 may include one or more antennas or antenna arrays, and is configured to send and/or receive wireless signals, and is connected to radio circuitry (e.g. radio front-end circuitry) 3510. In certain alternative embodiments, radio network node 12 may not include antenna 3540, and antenna 3540 may instead be separate from radio network node 3512 and be connectable to radio network node 3512 through an interface or port.

The radio circuitry (e.g. radio front-end circuitry) 3510 may comprise various filters and amplifiers, is connected to antenna 3540 and processing circuitry 3520, and is configured to condition signals communicated between antenna 3540 and processing circuitry 3520. In certain alternative embodiments, radio network node 3512 may not include radio circuitry (e.g. radio front-end circuitry) 3510, and processing circuitry 3520 may instead be connected to antenna 3540 without front-end circuitry 3510.

Processing circuitry 3520 may include one or more of radio frequency (RF) transceiver circuitry, baseband processing circuitry, and application processing circuitry. In some embodiments, the RF transceiver circuitry 3521, baseband processing circuitry 3522, and application processing circuitry 3523 may be on separate chipsets. In alternative embodiments, part or all of the baseband processing circuitry 3522 and application processing circuitry 3523 may be combined into one chipset, and the RF transceiver circuitry 3521 may be on a separate chipset. In still alternative embodiments, part or all of the RF transceiver circuitry 3521 and baseband processing circuitry 3522 may be on the same chipset, and the application processing circuitry 3523 may be on a separate chipset. In yet other alternative embodiments, part or all of the RF transceiver circuitry 3521, baseband processing circuitry 3522, and application processing circuitry 3523 may be combined in the same chipset. Processing circuitry 3520 may include, for example, one or more central processing units (CPUs), one or more microprocessors, one or more application specific integrated circuits (ASICs), and/or one or more field programmable gate arrays (FPGAs).

The radio network node 3512 may include a power source 3550. The power source 3550 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 3510, processing circuitry 3520, and/or memory 3530. The power source 3550, battery, power supply circuitry, and/or power management circuitry are configured to supply radio network node 12, including processing circuitry 3520, with power for performing the functionality described herein.

7.0. Supplemental Information

0. Introduction

For the PRACH preamble transmission, the following was agreed in RAN1-NR1: RACH SCS alternatives: SCS= [1.25 2.5 5 7.5 10 15 20 30 60 120 240] kHz. In an embodiment, in case RACH SCS=[15 30 60 120 240], there are two design options: (1) use the same SCS as the subsequent UL data and control; (2) use different SCS than the subsequent UL data and control. The following RACH preamble sequence types are considered: Zadoff-Chu; M-sequence; Zadoff-Chu with cover extension using M-sequence. Note that other designs are not precluded. In some embodiments, for single/multi-beam operation, for multiple/repeated RACH preamble transmissions, option 1, option 2, and option 4 may be considered.

In an embodiment, option 1 includes: CP is inserted at the beginning of the consecutive multiple/repeated RACH OFDM symbols, CP/GT between RACH symbols is omitted and GT is reserved at the end of the consecutive multiple/repeated RACH symbols.

In an embodiment, options 2/4 include: The same/different RACH sequences with CP is used and GT is reserved at the end of the consecutive multiple/repeated RACH sequences. For supporting various coverage and forward compatibility, flexibility in the length of CP/GT and the number of repeated RACH preambles and RACH symbols is supported. In some embodiments, specific use of these three options may depend on RACH subcarrier spacing and TRP beam correspondence.

In an embodiment, NR defines that: a random access preamble format consists of one or multiple random access preamble(s); a random access preamble consists of one preamble sequence plus CP; and one preamble sequence consists of one or multiple RACH OFDM symbol(s). UE transmits PRACH according to the configured random access preamble format.

1. Discussion

The PRACH preamble design for NR is discussed herein. Here, the preamble options are discussed in section 1.1, sub-carrier spacing in section [00208], PRACH preamble formats in section 1.3, capacity in section 1.4, and evaluations in section 1.5.

1.1 Preamble Options

Figure 16:
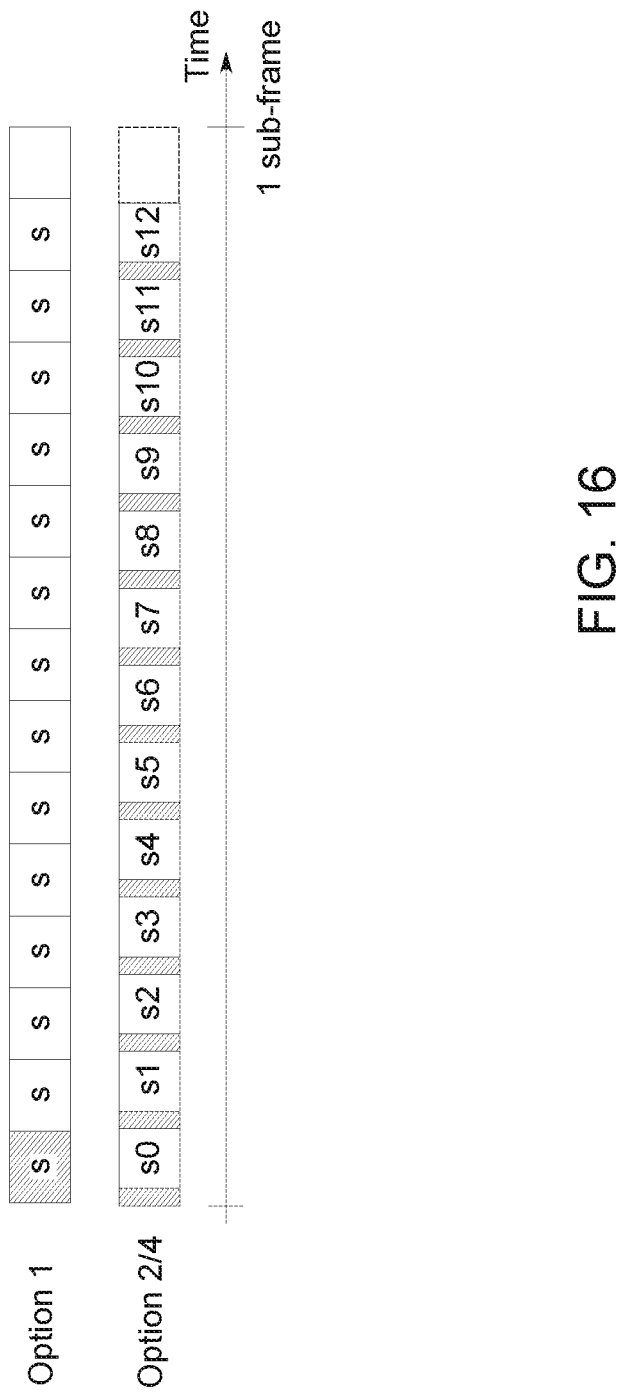
FIG. 16 illustrates PRACH preamble options according to some embodiments.

A list of 2 options for PRACH preambles was decided in RAN1-NR #1, see illustration in 6. In an embodiment, option 1 is based on repeating the same sequence (or PRACH OFDM symbol) without CP between the repetitions, such that one PRACH OFDM symbol acts as a cyclic prefix for the next PRACH OFDM symbol. FIG. 16 illustrates PRACH preamble options according to some embodiments.

In an embodiment, option 2 have the same sequence in all OFDM symbols while option 4 have different sequences for the repetitions, which can be used for OCC (Orthogonal Cover Codes). However, time varying channels and frequency offsets may significantly increase interference, i.e. loss of orthogonality, between preambles constructed with different OCCs. These options are discussed below in terms of supported cell size.

1.1.1 Cell Size

No explicit CP is included for option 1 in 6. Instead, the first PRACH OFDM symbol "s" acts as a CP for the following PRACH OFDM symbol. In this way, delays up to the length of the PRACH OFDM symbol are supported with a straight forward detector. Also estimation of delays larger than the length of one PRACH OFDM symbol is also possible for option 1, with a PRACH preamble detector as outlined in section 1.5.1.1. Simulation results are also given in section 1.5.1.1 of estimating delays larger than the length of one PRACH OFDM symbol.

In an embodiment, in option 2/4 the length of the CP limits the maximum delay of the PRACH preamble. An illustration is given in FIG. 17 of supported cell radius of options 1 and 2/4.

Figure 17:
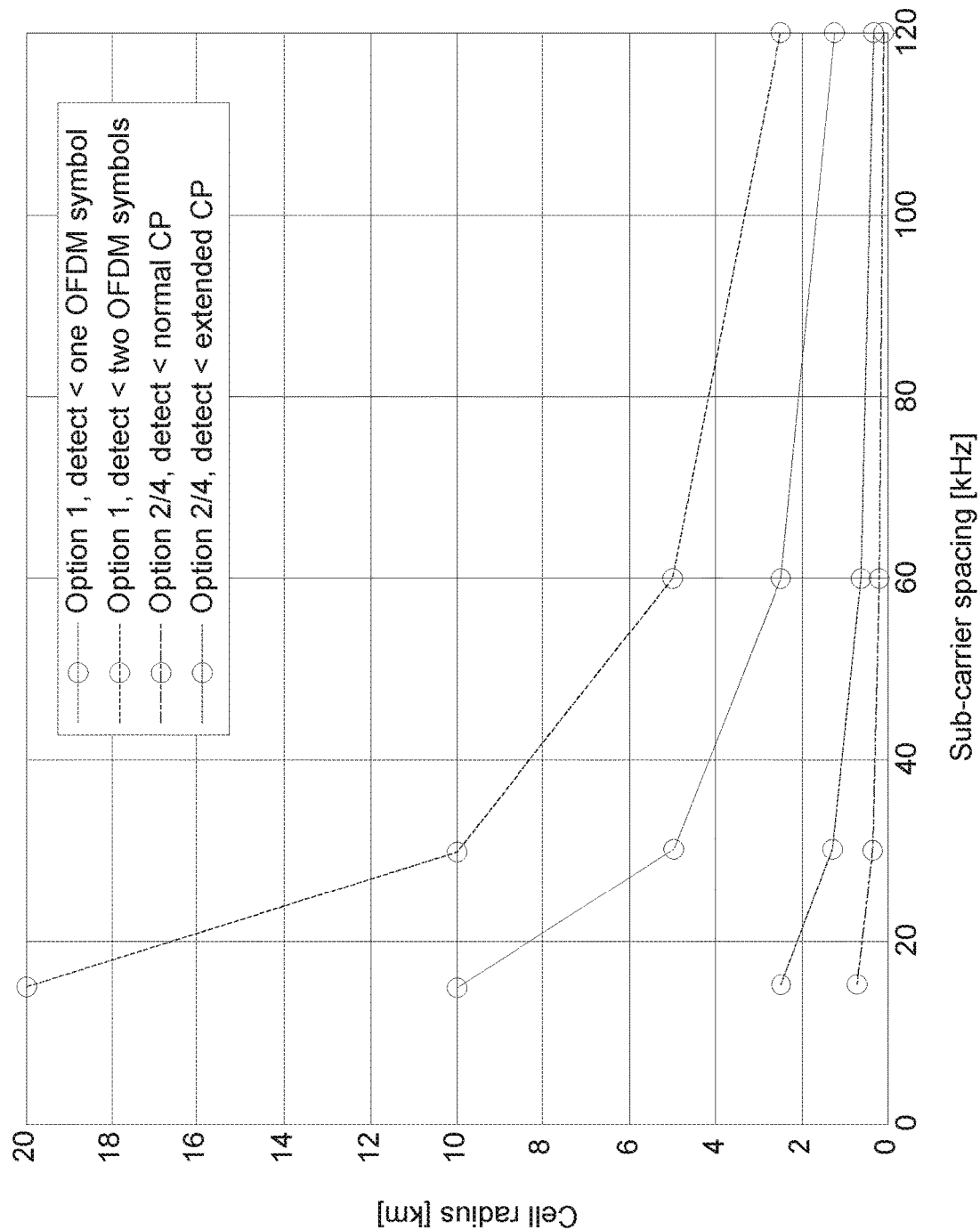
FIG. 17 illustrates cell radius support for options 1 and 2/4 as function of sub-carrier spacing and corresponding scaling of cyclic prefix according to some embodiments.

FIG. 17 illustrates cell radius support for options 1 and 2/4 as function of sub-carrier spacing and corresponding scaling of cyclic prefix. Illustrations are given in FIG. 17 for option 1 both with a detector for delays up to one OFDM symbol and with a detector for delays up to two symbols (section 1.5.1.1). For option 2/4, illustrations are given both with a normal CP and with an extended CP. For 15 kHz sub-carrier spacing we used 4.69 µs for normal CP and 16.67 µs for extended CP. The length of each CP is then scaled with the sub-carrier spacing, such that the normal CP is 4.69, 4.69/2, 4.69/4 and 4.69/8 µs for 15, 30, 60 and 120 kHz sub-carrier spacing respectively.

In an embodiment, for 15 kHz sub-carrier spacing, a cell size of 10 to 20 km can thus be supported with option 1. This in contrast to option 2/4 where only cell sizes up to 0.7 or 2.5 km can be supported depending on if normal or extended CP is used.

In some embodiments, larger cell radius can be supported for option 1 as compared to option 2/4. Option 2/4 is thus quite inefficient in terms of supported cell size as compared to option 1. Option 2 can be seen a (cell size) limited sub-set of option 1. Option 1 allows a flexible placements of receiver FFT windows in the PRACH preamble detection within the gNB. If the PRACH preamble reuse the same sub-carrier spacing as for data or control, then the same receiver FFTs can be used for PRACH preambles, data and control, see illustration in FIG. 17. Here no frequency guards are needed between PRACH preambles, data and control. Within PRACH preambles transmitted with option 1, the gNB can however alternatively place the FFT windows back-to-back as illustrated in 18. This placement of PRACH preamble FFT windows is not possible with option 2/4.

Here, the same FFTs cannot be used for data and control, but slightly more energy can be accumulated into the PRACH preamble detector.

Figure 18:
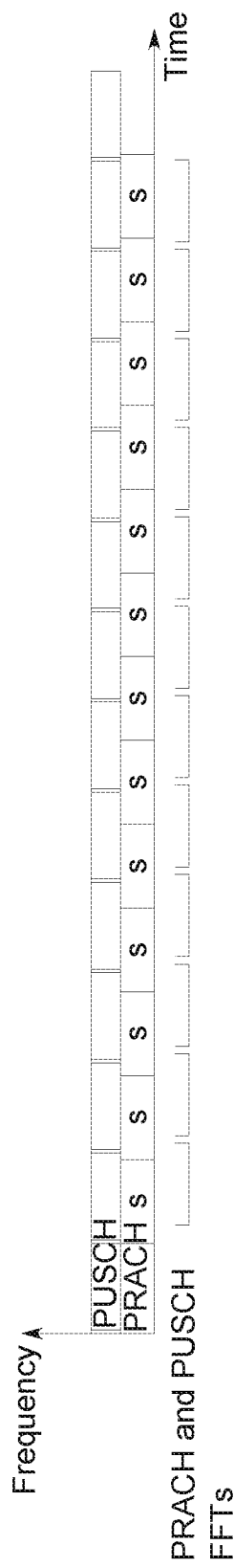
FIG. 18 illustrates a PRACH preamble with receiver FFT windows to be used for both PUSCH and PRACH preamble detection according to some embodiments.
Figure 19:
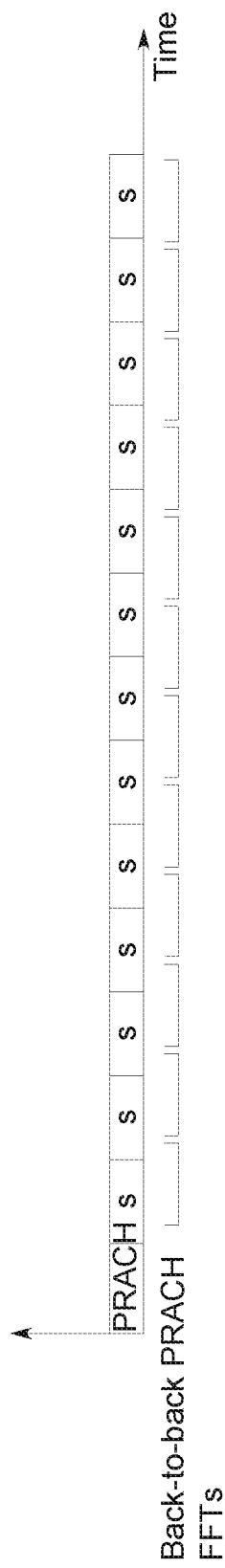
FIG. 19 illustrates a PRACH preamble with receiver FFT windows back-to-back for PRACH preamble detection according to some embodiments.
Figure 20:
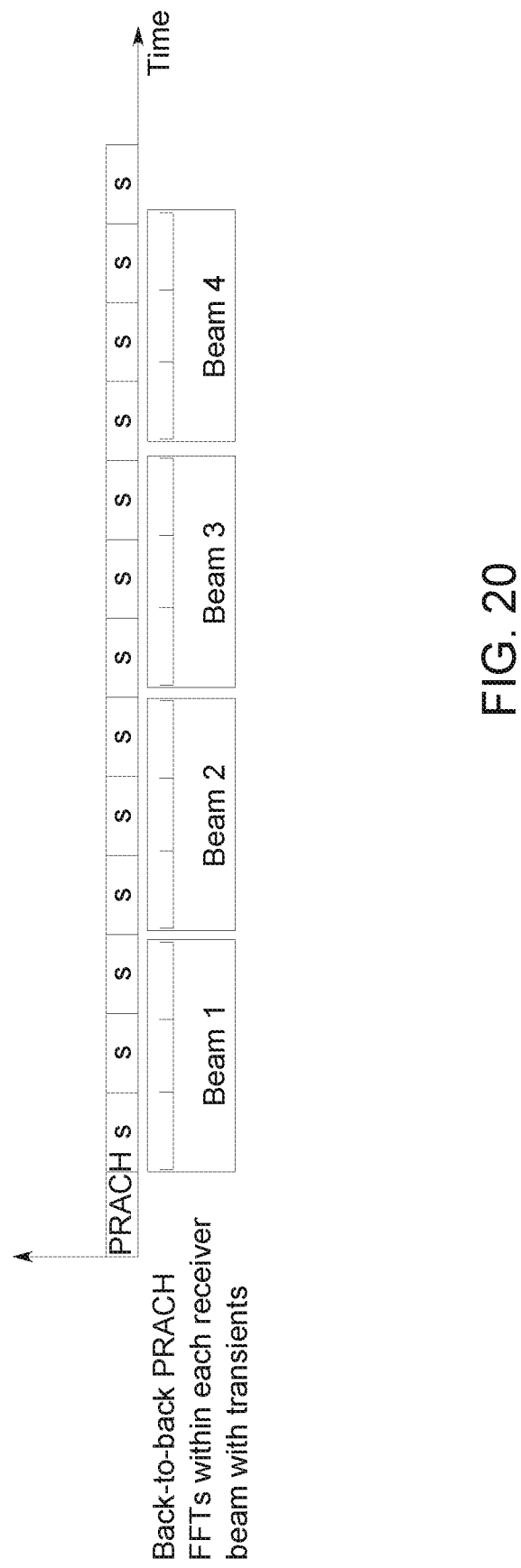
FIG. 20 illustrates a PRACH with receiver FFT windows back-to-back within each receiver beam and transients between according to some embodiments.

FIG. 18 illustrates a PRACH preamble with receiver FFT windows to be used for both PUSCH and PRACH preamble detection. FIG. 19 illustrates PRACH preamble with receiver FFT windows back-to-back for PRACH preamble detection. FIG. 20 illustrates PRACH preamble with receiver FFT windows back-to-back within each receiver beam and transients between.

In an embodiment, if the gNB use beam sweeping, such that the gNB needs some transients between these beams, then the gNB can delay the FFT windows somewhat between these beams. In FIG. 20, the PRACH FFT windows are placed back-to-back within each beam and with delay between the beams for transients in the receiver beam switching. This placement of PRACH preamble FFT windows may not be possible with option 2/4.

In an embodiment, a timing shift of the FFT windows in the receiver corresponds to a cyclic shift of the PRACH OFDM symbols. These shifts of the FFT windows are thus compensated by cyclic shifts of frequency domain matched filters in the PRACH preamble detector. The time shifts of the FFT windows in the gNB is thus implementation specific, where option 1 provides a flexibility which may not be possible within option 2/4.

In some embodiments, option 1 allows for flexible placements of receiver FFT windows, adjusting for PUSCH receivers or receiver beamforming transients In some embodiments, only support option 1 for the PRACH preamble. A straight forward frequency domain detector is used in the current evaluations of this contribution in section 2.5. A detector with lowpass filters, decimation and time domain matched filters can also be used for preamble detection. However, a frequency domain detector is believed to have lower computational complexity, especially if frequency multiplexing of PRACH preambles is supported. With a frequency domain PRACH preamble detector, the length of the CP sets a limit on the maximum delay. Thus, with a short CP between the OFDM symbols a very short delay can be estimated.

1.1.2 Link Budget
1.2 Sub-Carrier Spacing

In an embodiment, there are options for the number of subcarrier spacing alternatives for the downlink synchronization signals in a given frequency range and strive for minimizing the number of subcarrier spacing numerologies. For example, a reason to minimize the number of numerologies for the synchronization signals is to reduce the cell search complexity since each additional numerology adds to the UE complexity. In an embodiment, the subcarrier spacing alternatives within a given frequency range may be predefined in a specification.

Figure 21A:
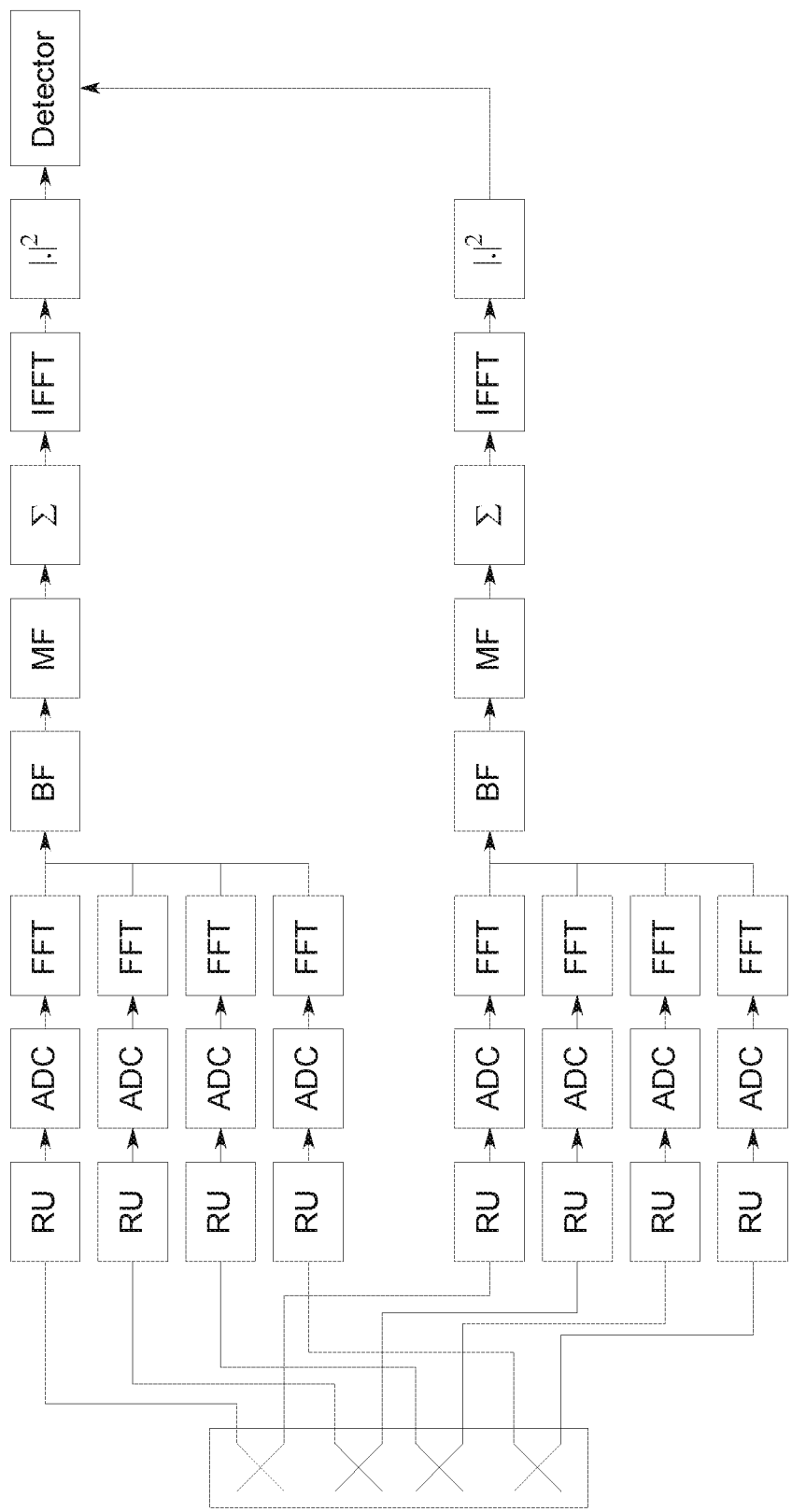
FIG. 21A illustrates digital beamforming with one FFT per antenna according to some embodiments.

FIG. 21A illustrates digital beamforming with one FFT per antenna. In some embodiments, there are benefits to using the same subcarrier spacing for the PRACH preamble transmission as for the UL data transmission since the processing in the base station can be using the same FFT for both the data and the PRACH (see also FIGS. 21B and 21C). Also, when using the same sub-carrier spacing, no guard sub-carriers are needed between data, control, and PRACH preambles.

In some embodiments, same sub-carrier spacing for uplink data, control and PRACH preambles enables use of a common receiver FFT and removes the need for guard bands. In some embodiments, an additional advantage is that the timing accuracy achieved from PRACH transmission can match the needed timing accuracy for UL control and data when the PRACH preamble transmission is the same as for the UL data and control. In some embodiments, the same numerologies can be supported for PRACH preamble transmissions as for UL data and control.

The simulation results in section 1.5.3 indicate that a sub-carrier spacing of 30 kHz can be used for robustness towards Doppler spread in high speed scenarios and 15 kHz for slow speed scenarios. Here a sub-carrier spacing of 15 kHz gives better robustness towards frequency errors as compared to 1.25 kHz (the LTE PRACH preamble sub-carrier spacing). Sub-carrier spacing frequencies of 15 and 30 kHz are proposed to be used for uplink data and control below 6 GHz. Above 6 GHz, the simulation results in section 1.5.3 indicates that sub-carrier spacing of 120 or 240 kHz can be used for robustness to frequency errors up to 15 ppm In some embodiments, below 6 GHz, a sub-carrier spacing of 15 kHz is robust against frequency errors in low speed scenarios and a sub-carrier spacing of 30 kHz for high speed scenarios. Above 6 GHz, a sub-carrier spacing of 120 kHz s and 240 kHz are robust The number of beams per time unit in the PRACH receiver increase when decreasing the length of each PRACH OFDM symbol (see illustration in FIG. 23). Thus, in some embodiments, a higher sub-carrier spacing leads to faster beam sweep latency. Within a sub-carrier spacing of 15 kHz, at most 12 receiver beams can be evaluated within a 1 millisecond sub-frame. This in contrast to a sub-carrier spacing of 1.25 kHz where one PRACH OFDM symbol is 0.8 ms such that only one receiver beam can be evaluated within one sub-frame of 1 millisecond.

In some embodiments, the supported number of beam sweep positions increase with increasing sub-carrier spacing. In some embodiments, the number of available preamble sequences is reduced when reducing the length of the sequence (i.e. increasing the sub-carrier spacing). This can be compensated by allocating different time and frequency resources for different UEs, and by changing the sequence design e.g. by using combined Zadoff-Chu and m-sequences.

In some embodiments, the capacity of PRACH preambles can be increased by using time and frequency resources. FFS if the PRACH preamble capacity can be further increase by using combined Zadoff-Chu and m-sequences In some embodiments, support sub-carrier spacing of 15 and 30 kHz for PRACH preambles below 6 GHz; in other embodiments, support sub-carrier spacing of 120 and 240 kHz for PRACH preambles above 6 GHz.

In some embodiments, the UE may use different techniques to find which numerology to use for UL data and control. In one embodiment, if this information is already available to the UE before the PRACH transmission (e.g., using system information for numerology of all UL transmissions), no additional signaling is needed. If numerology for UL data is not available, or if decoupling of the numerologies for PRACH and UL data is preferred, the PRACH preamble transmission numerology can be signaled in system information, with a PRACH (or initial) specific numerology. The UE could continue to use the initial numerology for transmission of first NR-PUSCH and subsequent UL transmissions until a different value has been signaled. In some embodiments, the numerologies to use for PRACH preamble transmissions (and subsequent transmissions) can be signaled in system information.

1.3 PRACH Preamble Formats

Proposals of formats to be supported for PRACH preambles are shown in FIGS. 21B and 21C where one set of formats are listed to be used below 6 GHz and another set of formats to be used above 6 GHz. Both the sets below and above 6 GHz have the same basic constructions, with only a change in sub-carrier spacing as parameterized with a variable "n". The exact length of the Guard interval and number of repetitions can vary, depending on link budget analysis. Also, additional formats may be considered, such as a 60 kHz sub-carrier spacing.

In some embodiments, same scalable PRACH construction, both below and above 6 GHz. Within the sub 6 GHz carrier frequency, six formats (A0 to A5) with sub-carrier spacing of 15 kHz are specified and six formats (B0 to B5) with a sub-carrier spacing of 30 kHz. Several PRACH sub-carrier spacings are thus proposed to be supported on the same carrier frequency. The small sub-carrier spacing formats (A0 to A5) can be used in larger cells as compared to larger sub-carrier spacing (B0 to B5). The large sub-carrier spacing is suitable for time critical initial access, low latency data channels and high speed scenarios, as indicated by the simulations of 500 km/h in section 1.5.3.

In some embodiments, support several PRACH sub-carrier spacings for each carrier frequency. The three formats (x0 to x5), where x is A or B, have different lengths of the PRACH preamble such that they can be used for different coverage situations or for different receiver beamforming sweep. An illustration is given in FIGS. 21B and 21C for the three formats, where the length of each format is changed depending of sub-carrier spacing. Here, a slot is used as time unit on the horizontal axis with 14 PUSCH OFDM symbols in each slot.

Figure 22:
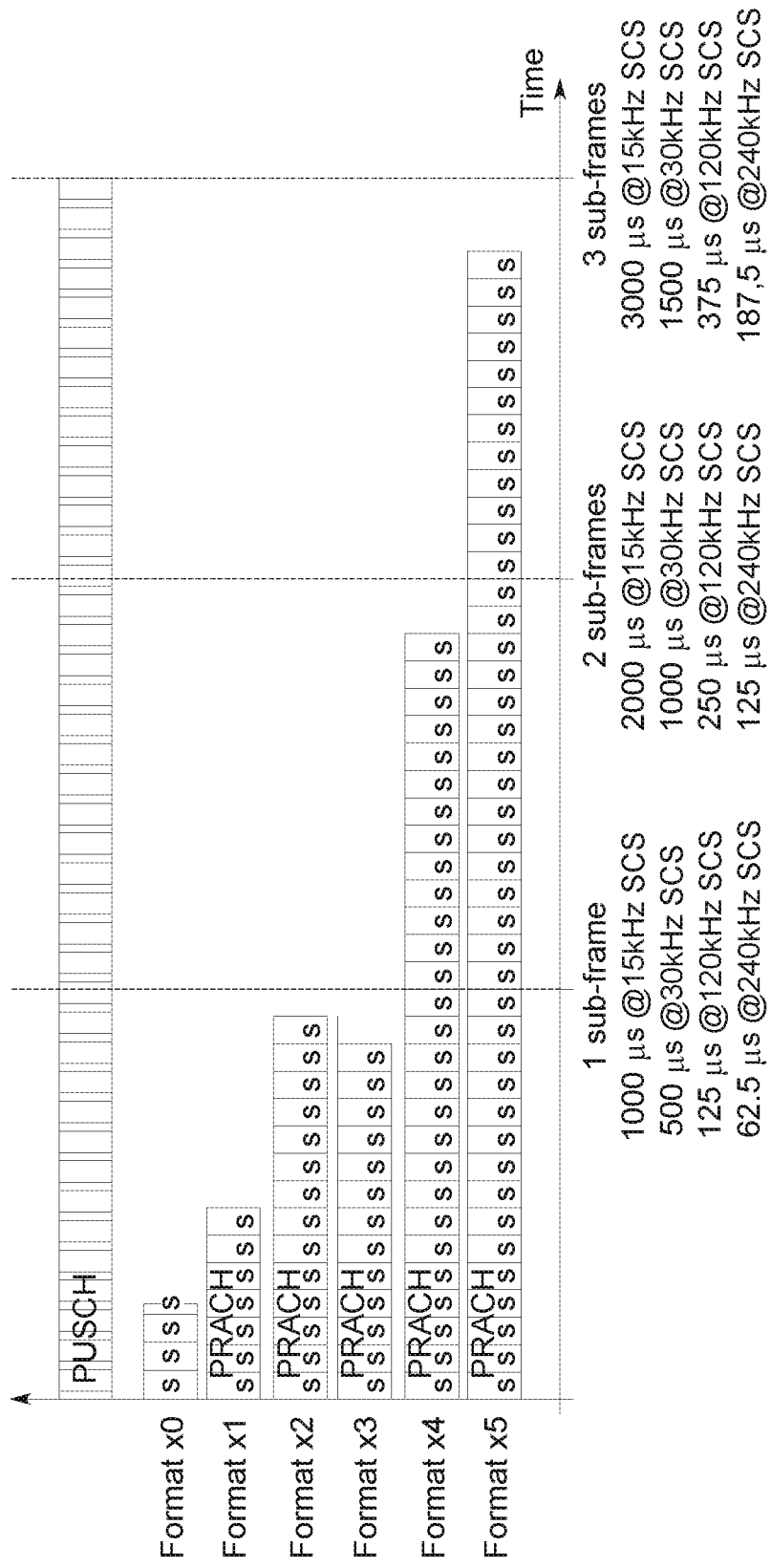
FIG. 22 illustrates rescaling of PRACH preamble formats with respect to sub-carrier spacing (SCS) according to some embodiments.

In some embodiments, support several PRACH formats for coverage adjustment. FIG. 22 illustrates rescaling of PRACH preamble formats with respect to sub-carrier spacing (SCS)

1.4 PRACH Capacity

An illustration of PRACH resources configured in PBCH is given in.

FIG. 22. Several SS blocks, each containing one NR-PSS, one NR-SSS, and one PBCH are illustrated. Possibly, an NR-TSS (Tertiary Synchronization Signal) can also be included in the SS-block. In an embodiment, these SS blocks are transmitted in different beams from the gNB. Each PBCH contains a Management information base (MIB), where these MIBs are numbered as MIB1, MIB2, etc.

In the example in FIG. 22, both MIB1 and MIB2 configures PRACH resources in the same frequency interval. Here MIB1 and MIB2 can indicate different set of PRACH preamble sequences. A second frequency interval is configured in MIB3. The fourth PBCH contains a MIB4 which is allocated to another time interval as compared to MIB1, MIB2 and MIB3.

A PRACH preamble index can be then identified by a combination of the following parameters: Sequence: e.g. root sequence between 1 to 70 for a Zadoff-Chu sequence with 71 sub-carriers; e.g. cyclic shifts of the root sequence. This cyclic shift can be larger than maximum RTT (Round Trip Time) in the cell where the gNB is active. Frequency resource: Subband index describing the location of the PRACH signal; e.g. 0 to 9 for a 10 MHz carrier where each PRACH preamble allocate 1 MHz. Subframe: Timing offsets indicating future subframe for PRACH preamble; e.g. with 2 different possible sub-frames.

In the above example, the total number of PRACH preambles is equal to 70*10*2=1400. This is significantly larger than the 838 PRACH root sequences in LTE. Time allocations in LTE may be restricted not allowing longer time intervals of PRACH preamble resources than every second frame. Thus in LTE, very few possible time allocations may be possible. Also, the frequency allocations in LTE are restricted due to single-carrier in uplink. In LTE, the PRACH preamble is preferrably placed on the edges of the system bandwidth in order to avoid frequency domain scheduling limitations. This is in contrast to NR, where OFDM may be supported in uplink, which thus simplifies frequency domain scheduling and allows the PRACH preamble to be placed anywhere inside the system bandwidth.

In some embodiments, using OFDM in uplink simplifies allocations of PRACH resources in frequency domain as compared to DFTS-OFDM as used in LTE. In some embodiments, one random access preamble is identified by a combination of frequency interval, timing interval, and sequence.

Figure 23:
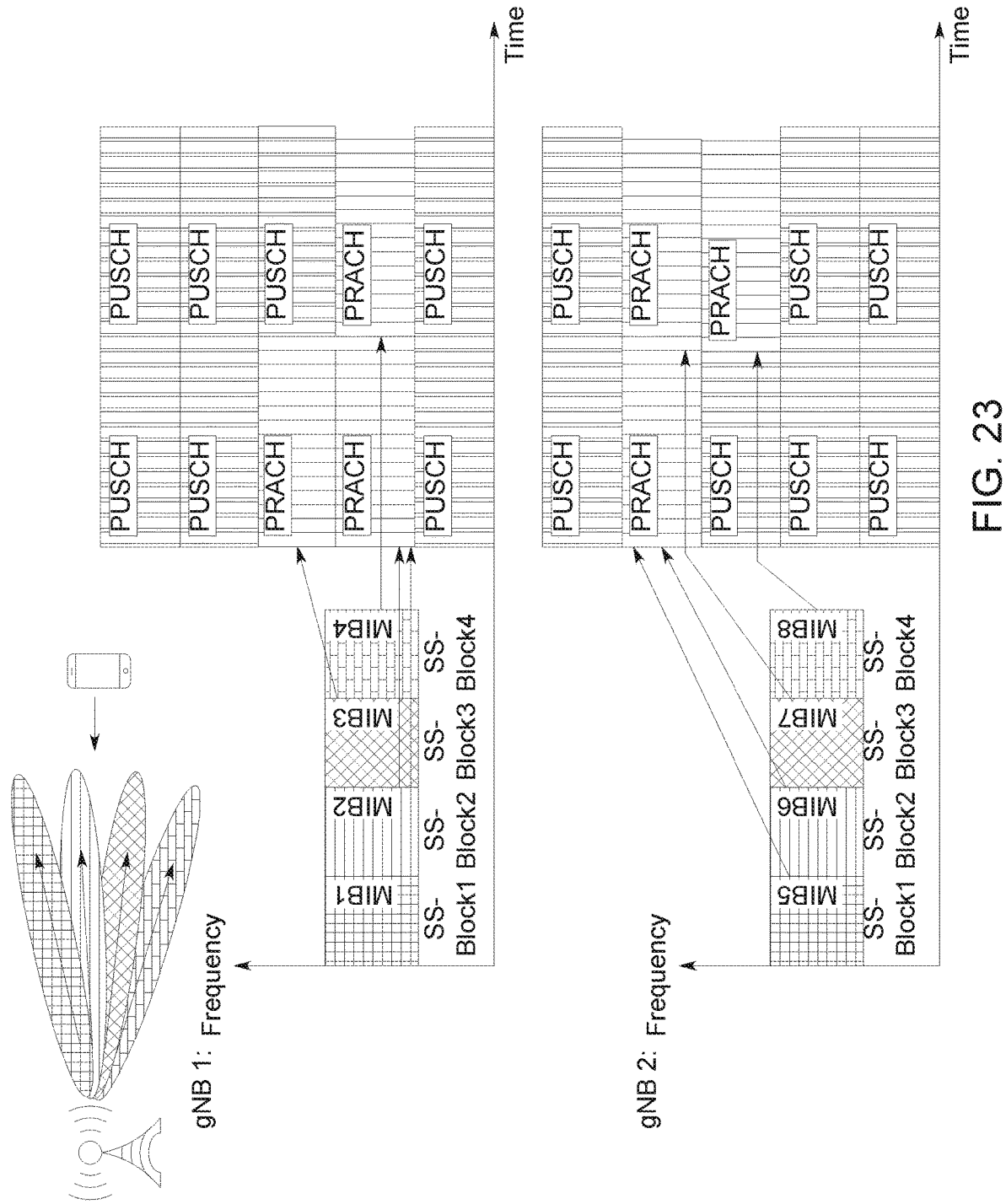
FIG. 23 illustrates the relation between synchronization signals (NR-PSS and NR-SSS), MIB, and PRACH resources for two gNBs.

FIG. 23 illustrates a relation between synchronization signals (NR-PSS and NR-SSS), MIB, and PRACH resources for two gNBs. An illustration of PRACH configuration of two gNBs is given in FIG. 23. Here, the two gNBs are using non-overlapping time/frequency resources. The resources that are not used for PRACH might be used for other UL transmissions to the given gNB. In other words, at each gNB, only the resources used by random access for that gNB need to be excluded from UL grants in that gNB. If the two gNBs are close, then the PUSCH transmissions will introduce interference in the reception of PRACH preambles. However, PUSCH transmissions will most likely not generate a PRACH detection since the PUSCH has low correlation with PRACH preambles.

In an embodiment, each UE is assumed to decode at least one PBCH which contains a set of PRACH preambles from which the UE selects one to be transmitted. One such configuration can be one time and frequency resource and a set of PRACH preamble sequences.

In some embodiments, time and frequency resources can be utilized for PRACH allocations in order to reduce inter-cell interference. In some embodiments, a configuration with several time resources may be beneficial, for example, in unlicensed spectrum when the UE does an LBT (Listen Before Talk) before transmitting PRACH preamble. If the LBT fails in one such time allocation, then the UE can try another time allocation.

The capacity of PRACH can be further increase by considering other sequences than Zadoff-Chu as used in LTE. For example, the PRACH preamble sequence can e.g. use combined Zadoff-Chu and m-sequences.

In some embodiments, the PRACH preamble capacity can be increased by considering combinations of Zadoff-Chu and m-sequences.

1.5 Evaluations 1.5.1 Evaluation Settings

In some embodiments, the following simulation settings may be used: Carrier frequency of 4 GHz, 30 GHz, or 70 GHz; Allocation of 72 subcarriers for the NR PRACH preamble design (option 1, multiple repetitions of a short sequence), with subcarrier spacings ranging from 15 kHz to 480 kHz. For comparison, a design with a single long sequence like LTE format 0 was also simulated (864 subcarriers allocated, with subcarrier spacing 1.25 kHz). Zadoff-Chu sequences (length 71 and length 839 for the NR and LTE designs, respectively). Random delay between 0 and 2 µs, between 0 and 20 µs, or between 0 and 130 µs, uniformly distributed: Corresponding to a maximum distance of 300 m, 3 km or 20 km, respectively; Search window covering the delay range (with slight margin); Detection considered correct if delay estimation error is at most ±40% of PUSCH CP. CDL-C channel: 30 ns or 100 ns delay spread; Random phase in fading generator for each preamble; UE speed 3 km/h or 500 km/h; Default angular spreads (used unless otherwise stated): ASA 30°, ASD 5°, ZSA 5°, ZSD 1°. Frequency offset of 0.05 ppm at the TRP and 0.1 ppm at the UE (i.e. 0.15 ppm in total). Antennas: UE: Single directional antenna element with vertical polarization (HPBW 90°, directivity 5 dB); TRP: Directional antenna elements (HPBW 65°, directivity 8 dB, polarization angles ±45°), arranged as (1,1,2) (simulations without beam scan) or (4,8,2) (simulations with beam scan); the antennas are for each preamble given a different random azimuth rotation in the range ±30° around the main channel cluster. Receiver (TRP) beam scan: 12 fixed beams, evenly spaced in spatial frequency with 6 horizontal and 2 vertical directions (below the horizon). False detection rate 0.1% in noise (total over 64 detectors), unless otherwise stated.

A receiver can be used for delays up to 1 OFDM symbols. Evaluations using this receiver, showed that the proposed NR PRACH preamble design can perform better than the LTE PRACH preamble design. A receiver structure can be used for delays longer than 1 OFDM symbol was and is described in more detail in Section 1.5.1.1.

Figure 24:
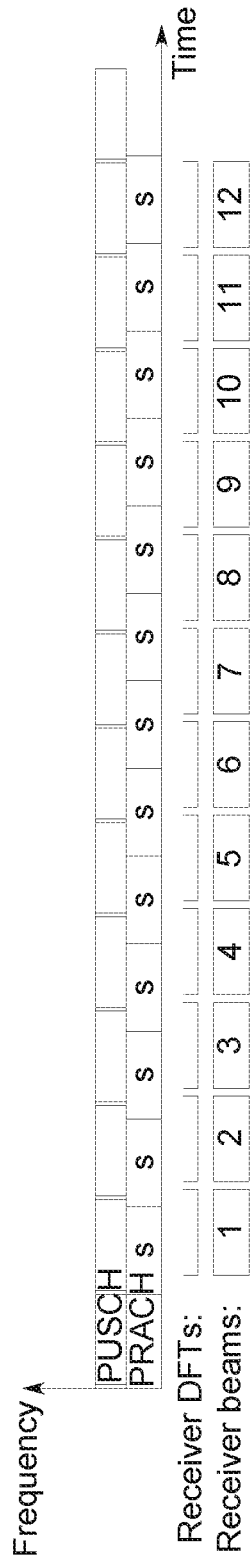
FIG. 24 illustrates a sequential beam scan, illustrated for the case of 12 beams, for NR according to some embodiments.

Two types of receiver beam scan—parallel and sequential—were discussed and evaluated. In the present contribution, only sequential scan using 12 beams is used, see illustration in FIG. 24. FIG. 24 illustrates a sequential beam scan, illustrated for the case of 12 beams, for NR.

1.5.1.1 Long Delays

Figure 25:
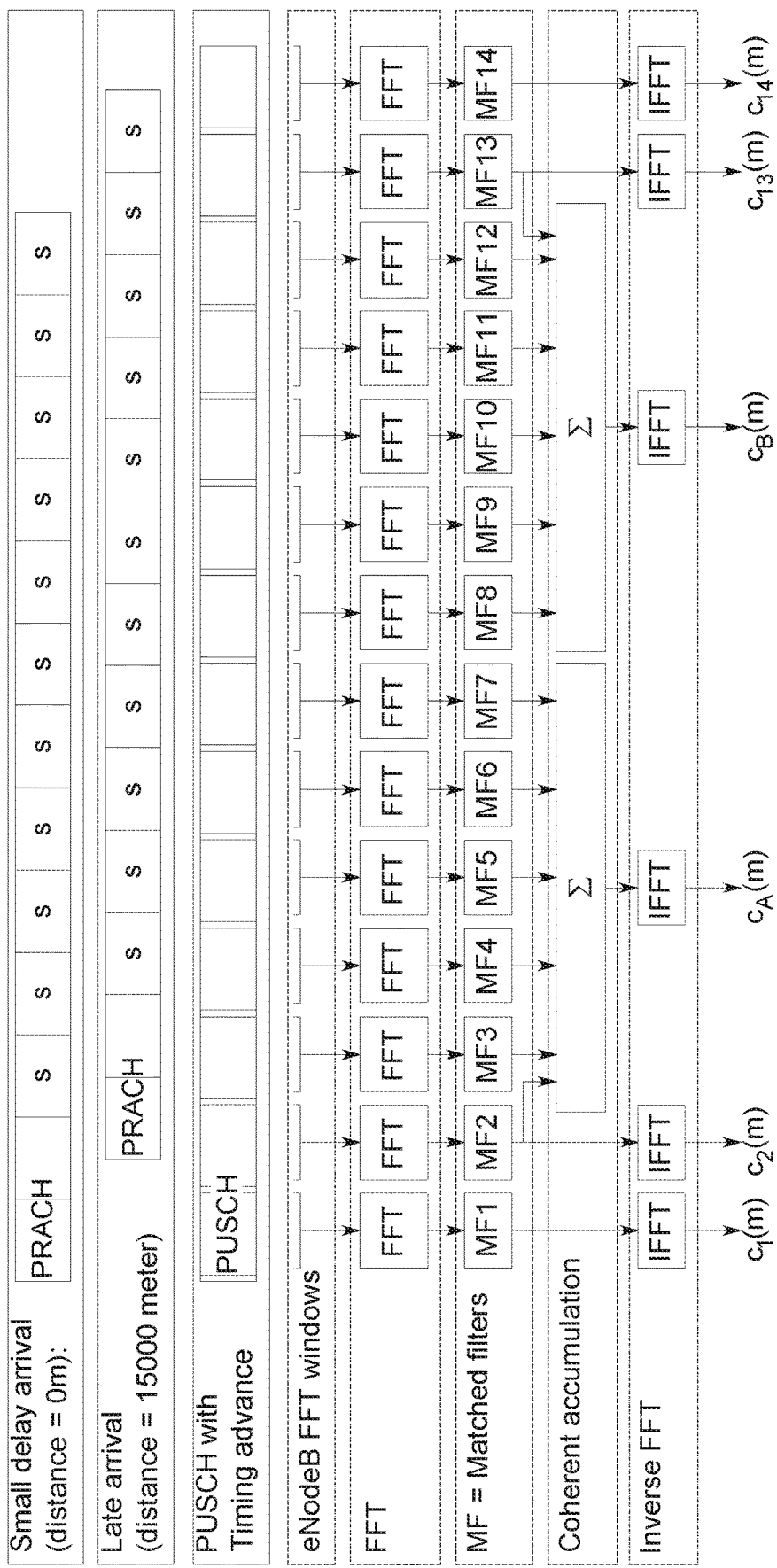
FIG. 25 illustrates a large delay PRACH preamble detector outline according to some embodiments.

In some embodiments, delays up to the length of one PRACH OFDM symbols can be detected by frequency domain matched filters. However, this receiver structure results in a delay ambiguity when the delay exceeds the length of the PRACH OFDM symbol. A modified PRACH preamble detector can be used. An example of a PRACH preamble detector for handling large delays is illustrated in more detail in FIG. 25 below. Here, a detector is included which compares the received signal in first and last FFT time windows resulting in a decision if delays are smaller or larger than the length of the PRACH OFDM symbol. This decision can then be combined with a delay estimator resulting in a delay estimate with high time resolution and with possible delays larger than one PRACH OFDM symbol.

In more detail, let $$\hat{m} = \arg\max_m (|c_A(m)|^2 + |c_B(m)|^2)$$

estimate $\hat{T}_{delay} = \hat{m}/(\Delta f \cdot N_{IFFT})$, where $\Delta f$ is the subcarrier spacing. The decision whether the delay is smaller or large than on symbol can in principle be taken based on a comparison of early arrival energies $|c_1(\hat{m})|^2$ and $|c_2(\hat{m})|^2$ versus late arrival energies $|c_{13}(\hat{m})|^2$ and $|c_{14}(\hat{m})|^2$. However, better performance can be obtained by calculating the decision from the signal components of $c_n(m)$, n=1, 2, 13, 14, that are in phase with $c_A(\hat{m})$ and $c_B(\hat{m})$. In other words, projected early-arrival and late-arrival energies can be estimated as $$P_{early} = \text{Re}\{w_1(\hat{m})c_1^*(\hat{m})\bar{c}(\hat{m}) + w_2(\hat{m})c_2^*(\hat{m})\bar{c}(\hat{m})\}$$

and $$P_{late} = \text{Re}\{w_{13}(\hat{m})c_{13}^*(\hat{m})\bar{c}(\hat{m}) + w_{14}(\hat{m})c_{14}^*(\hat{m})\bar{c}(\hat{m})\},$$

where $w_n(\hat{m})$ are (optional) real-valued weight factors and $\bar{c}(\hat{m}) = \frac{1}{2}(c_A(\hat{m}) + c_B(\hat{m}))$. Frequency offset can be estimated between the $c_A(\hat{m})$ and $c_B(\hat{m})$ such that the signal components $c_A(\hat{m})$ and $c_B(\hat{m})$ can be phase-adjusted in the projected early-arrival and late-arrival energies.

1.5.2 Evaluations Comparing Different Numerologies (3 km/h)

Figure 26:
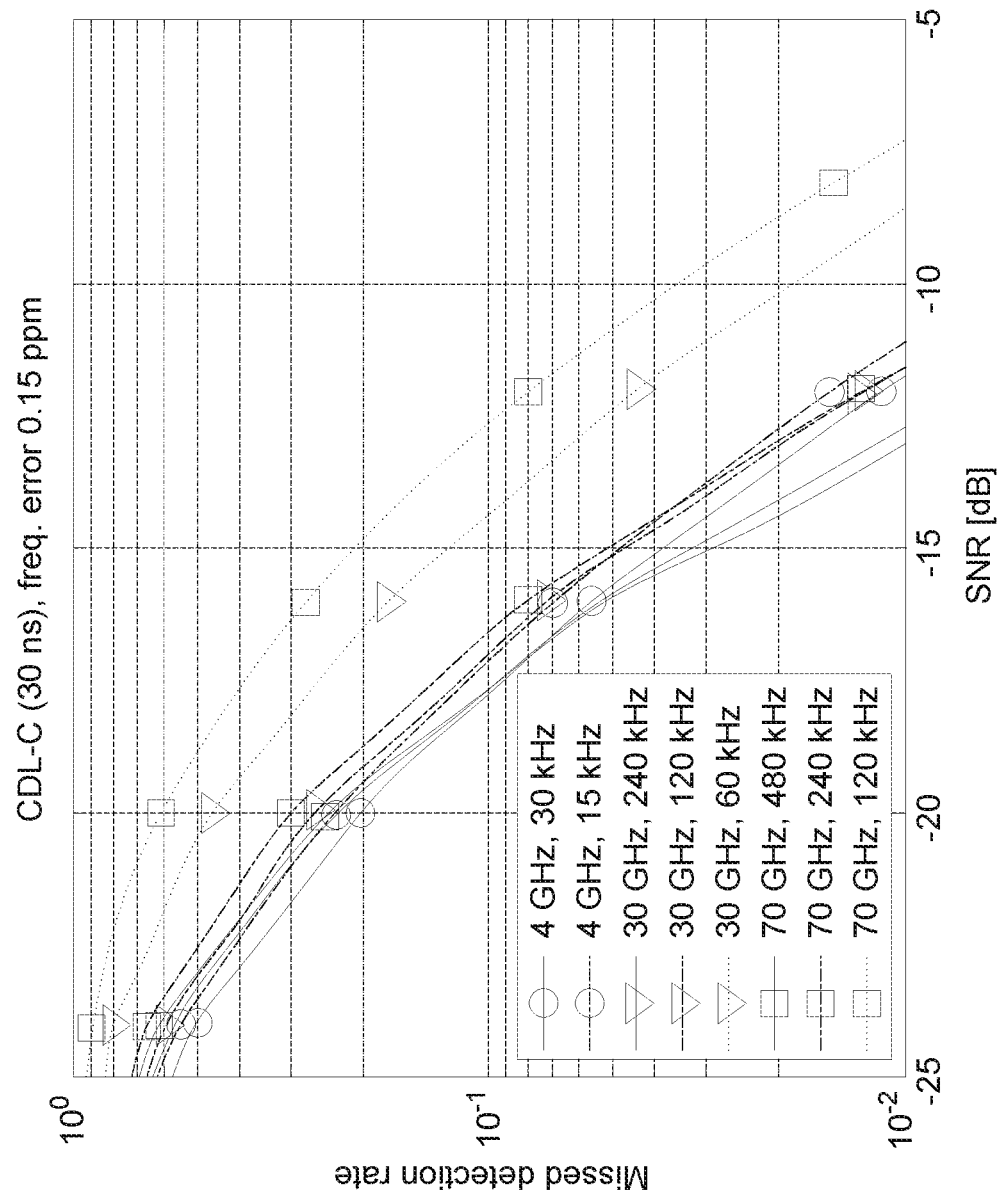
FIG. 26 illustrates performance at different carrier frequencies with different numerologies, with channel delay spread 30 ns, and up to 2 μs delay, with no beam scan according to some embodiments.

Simulations for 4 GHz, 30 GHz, and 70 GHz, with different subcarrier spacings are shown in FIG. 26. No beam scan is used here. It seems that 15 kHz works well at 4 GHz (but see next section for 500 km/h), whereas it would be desirable to allow 120 kHz and 240 kHz for use at 30 GHz and 70 GHz, respectively. FIG. 26 illustrates performance at different carrier frequencies with different numerologies, with channel delay spread 30 ns, and up to 2 μs delay, with no beam scan.

1.5.3 Evaluations of High Speeds (500 km/h)

1.5.3.1 Without Beam Scan

Figure 27:
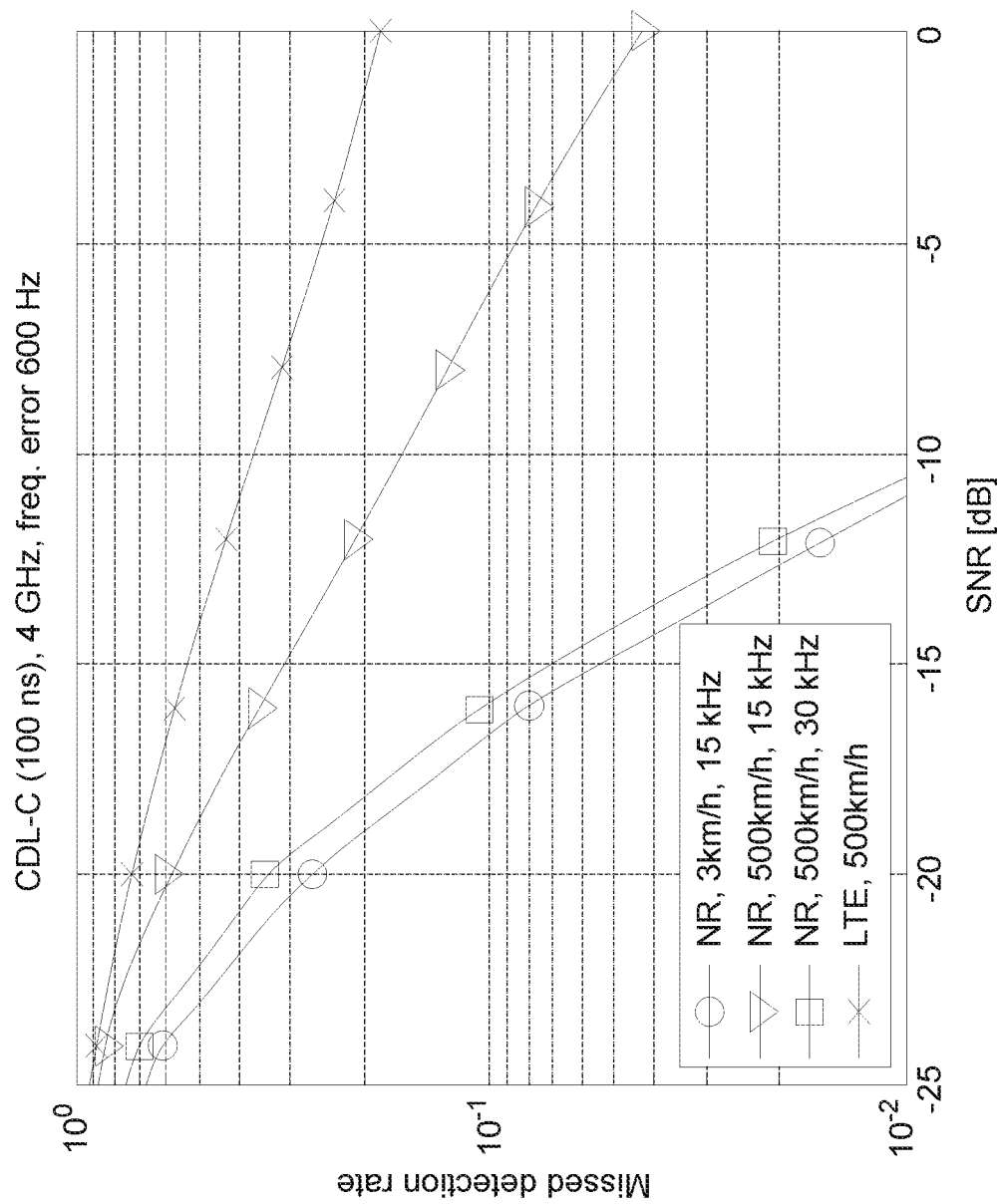
FIG. 27 illustrates missed detection rate without receiver beam scan, at carrier frequency 4 GHz, channel delay spread 100 ns, with up to 20 μs delay, and with no beam scan according to some embodiments.

In some embodiments, the performance at 500 km/h without beam scan and FIG. 27, for 4 GHz carrier frequency and different subcarrier spacings (15 kHz and 30 kHz, corresponding to formats A2 and B2, respectively). As can be seen, the proposed NR PRACH design performs very well (close to performance at 3 km/h) if a subcarrier spacing of 30 kHz is used. The LTE design on the other hand performs poorly at 4 GHz. It should be noted, though, that a fairly simple receiver algorithm is used here, both for NR and for LTE; with a more advanced algorithm, both NR with 15 kHz subcarrier spacing and LTE may perform better, at the expense of increased computational complexity.

In some embodiments, high-speed (500 km/h) performance of the proposed NR PRACH design is found to be good at 4 GHz using 30 kHz subcarrier spacing, whereas the LTE PRACH design performs much worse.

FIG. 27 illustrates missed detection rate without receiver beam scan, at carrier frequency 4 GHz, channel delay spread 100 ns, with up to 20 μs delay, and with no beam scan.

Figure 28:
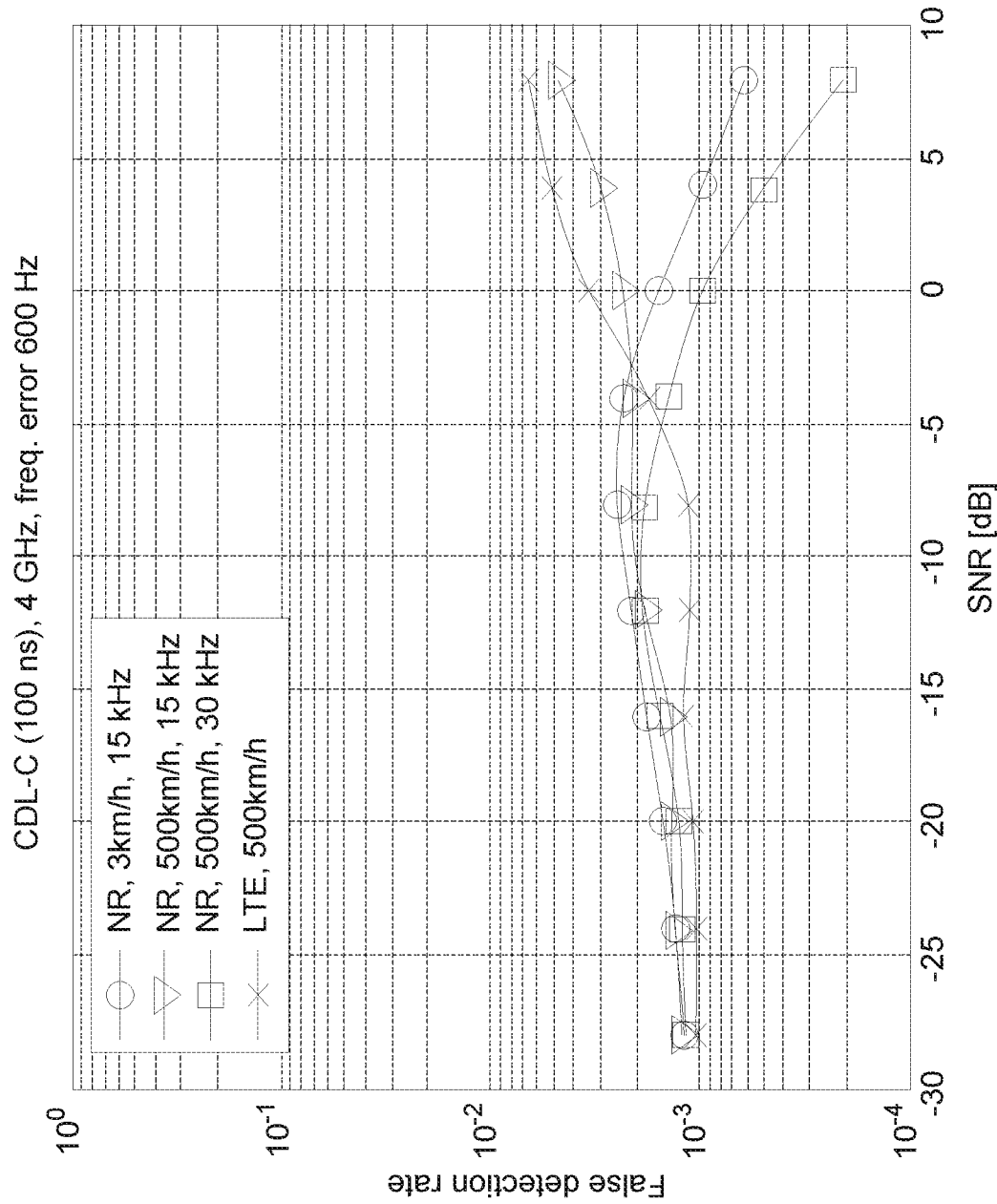
FIG. 28 illustrates false detection rate without receiver beam scan, at carrier frequency 4 GHz, channel delay spread 100 ns, with up to 20 μs delay, and with no beam scan according to some embodiments.

FIG. 28 illustrates false detection rate without receiver beam scan, at carrier frequency 4 GHz, channel delay spread 100 ns, with up to 20 μs delay, and with no beam scan.

1.5.3.2 With Sequential Beam Scan

Figure 29:
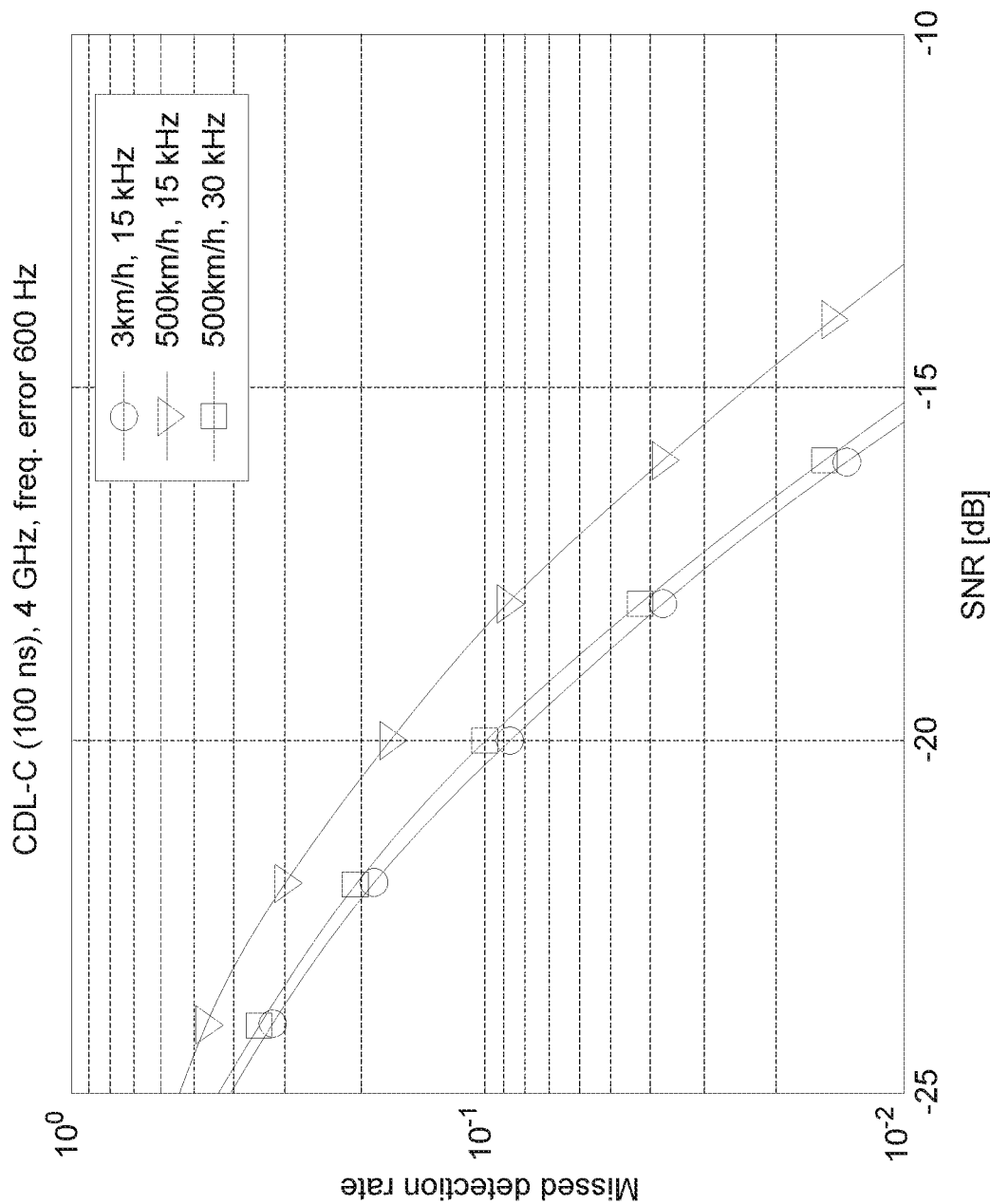
FIG. 29 illustrates missed detection rate with sequential receiver beam scan, at carrier frequency 4 GHz, channel delay spread 100 ns, with up to 20 μs delay, and with sequential beam scan according to some embodiments.
Figure 30:
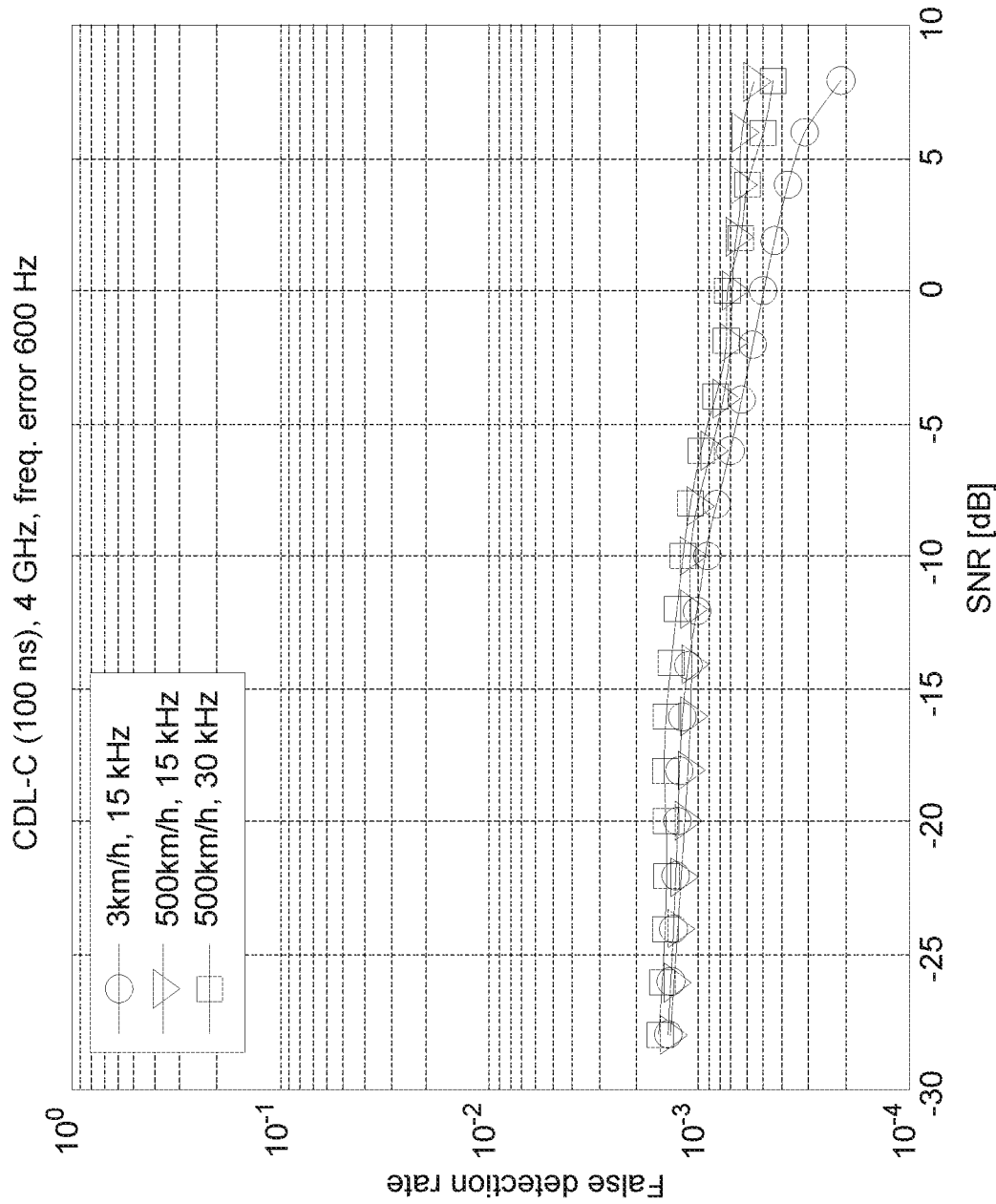
FIG. 30 illustrates false detection rate with sequential receiver beam scan, at carrier frequency 4 GHz, channel delay spread 100 ns, with up to 20 μs delay, and with sequential beam scan according to some embodiments.

The performance at 500 km/h with sequential beam scan is shown in FIG. 29 and FIG. 30, for 4 GHz carrier frequency and different subcarrier spacings (15 kHz and 30 kHz). As can be seen, the proposed NR PRACH design again performs very well with subcarrier spacing 30 kHz (close to performance at 3 km/h). Furthermore, in contrast to the case without beam scan, the proposed NR PRACH design here performs decently well also with 15 kHz subcarrier spacing. This improvement with sequential beam scan is natural as there is then no combining of multiple DFT windows across the duration of the preamble. At least one LTE design has been shown to perform poorly with sequential beam scan even at 3 km/h.

In some embodiments, also with receiver beam scan, high-speed (500 km/h) performance of the proposed NR PRACH design is found to be good at 4 GHz, in particular with 30 kHz subcarrier spacing.

FIG. 29 illustrates missed detection rate with sequential receiver beam scan, at carrier frequency 4 GHz, channel delay spread 100 ns, with up to 20 μs delay, and with sequential beam scan. FIG. 30 illustrates false detection rate with sequential receiver beam scan, at carrier frequency 4 GHz, channel delay spread 100 ns, with up to 20 μs delay, and with sequential beam scan.

1.5.4 Evaluations with Long Delays (>1 OFDM symbol)

Simulation results with delays up to 2 OFDM symbols are shown in FIG. 26, using format A3 (i.e. a guard of 2 PRACH OFDM symbols), with single receive antenna, and all antennas isotropic. The solid curves illustrate performance when the delay estimation tolerance is 40% of the PUSCH CP, and as can be seen, NR performs much better than LTE. For reference, the dashed line show performance when a detection is (unrealistically) considered correct irrespective of any delay estimation error.

In some embodiments, also with long delays (>1 PUSCH OFDM symbol), the proposed NR PRACH design can outperform the LTE PRACH design.

Figure 31:
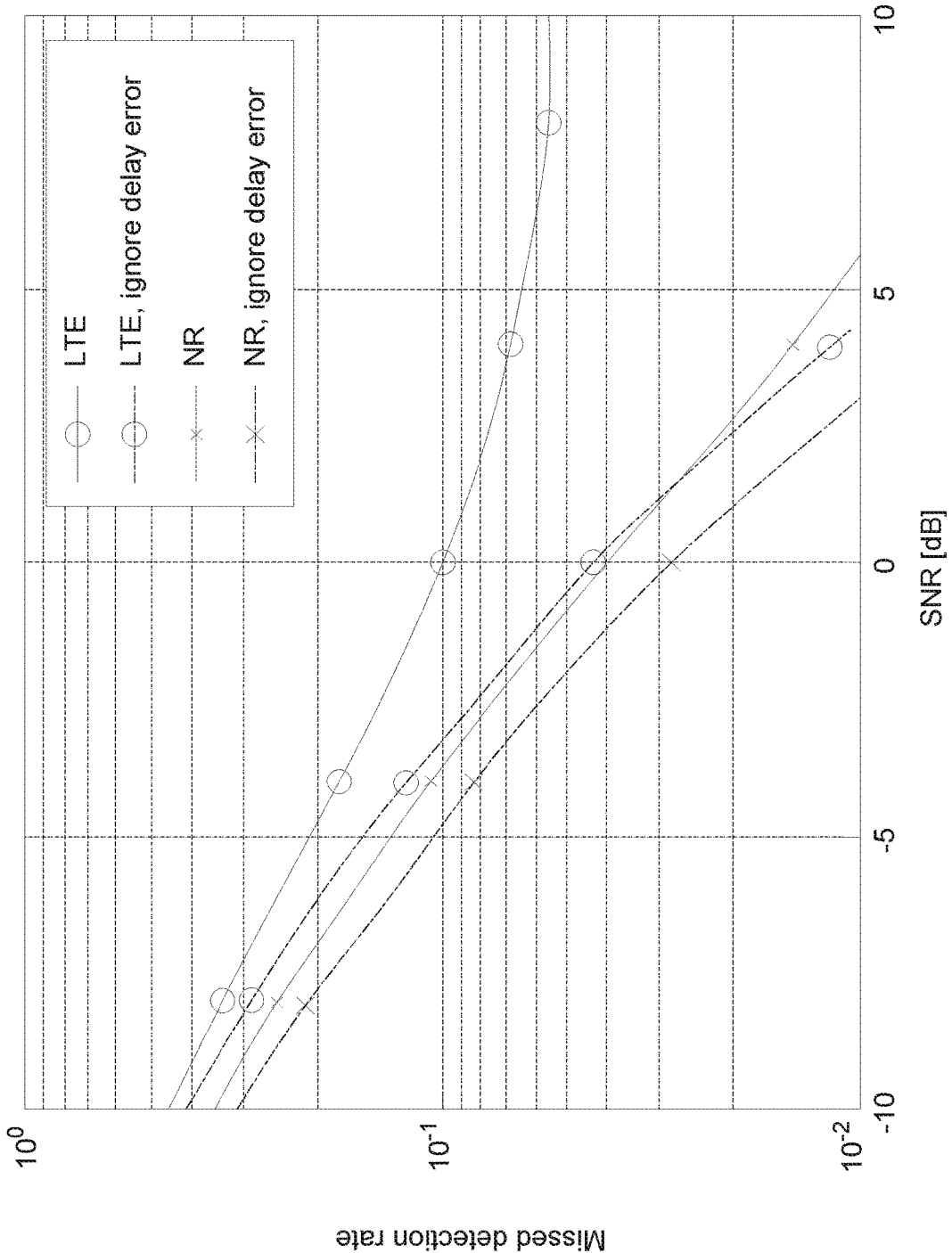
FIG. 31 illustrates missed detection rate without receiver beam scan, at carrier frequency 4 GHz, channel delay spread 100 ns, and with up to 2 OFDM symbol delay according to some embodiments.

FIG. 31 illustrates missed detection rate without receiver beam scan, at carrier frequency 4 GHz, channel delay spread 100 ns, and with up to 2 OFDM symbol delay.

ABBREVIATIONS

| Abbreviation | Explanation |
|---|---|
| 3GPP | 3rd Generation Partnership Project |
| 4G | Fourth Generation |
| 5G | Fifth Generation |
| ASIC | Application-specific integrated circuit |
| BF | Beam forming |
| CP | Cyclic prefix |
| DFT | Discrete Fourier Transform |
| DL | Downlink |
| FDD | Frequency-Division Duplex |
| FFT | Fast Fourier Transform |
| IDFT | Inverse Discrete Fourier Transform |
| IFFT | Inverse Fast Fourier Transform |
| LTE | Long-Term Evolution |
| MF | Matched Filter |
| OFDM | Orthogonal frequency-division multiplexing |
| NR | New Radio |
| PBCH | Physical broadcast channel |
| PRACH | Physical random-access channel |
| PRB | Physical Resource Block |
| PSS | Primary Synchronization Signal |
| PUCCH | Physical uplink control channel |
| PUSCH | Physical uplink shared channel |
| RB | Resource Block |
| RU | Radio Unit |
| SC | Sub-Carrier |
| SC-FDMA | Single Carrier - Frequency-Division Multiple Access |
| SNR | Signal to Noise Ratio |
| SRS | Sounding Reference Signal |
| SSS | Secondary Synchronization Signal |
| TDD | Time Division Duplex |
| TRP | Transmission and Reception Point (e.g. base station, access point, etc.) |
| UE | User Equipment |
| UL | Uplink |
| ZC | Zadoff-Chu |

The invention claimed is:

1. A method in a radio network node for processing a preamble used in a wireless communication system, the method comprising:
receiving, from a user equipment (UE), the preamble including a plurality of identical short sequences, the preamble being split into two portions, a first of the two portions transmitted by the UE using a first transmission characteristic, and a second of the two portions transmitted by the UE using a second transmission characteristic that is different from the first transmission characteristic, and a difference between the first transmission characteristic and the second transmission characteristic being based on a predefined time offset inserted by the UE between the first portion and the second portion, the time offset being generated by the UE omitting the transmission of one or more sequence elements;
determining, by a preamble detector, a fractional-symbol delay (Tfrac) of at least one of the plurality of short sequences; and
based at least in part on the determined Tfrac, using at least one of a first part of the preamble detector, the first part used to detect portions of the preamble arriving during an early time window of a plurality of time windows, and a second part of the preamble detector, the second part used to detect portions of the preamble arriving during a late time window of the plurality of time windows, to process at least one short sequence of the plurality of short sequences as part of calculating a propagation delay between the UE and the radio network node.

2. The method of claim 1, further comprising:
determining, based on the calculated propagation delay, a timing advance, wherein the UE uses the timing advance to adjust the timing of a future transmission to the radio network node; and
transmitting the timing advance to the UE.

3. The method of any claim 1, wherein the receiving includes receiving the preamble on a physical random access control channel (PRACH).

4. The method of claim 1, wherein the time offset is further generated by one or more of: inserting a small guard interval between the two portions, repeating one or more sequence elements and inserting a short cycle prefix between the two portions.

5. The method of claim 1, further comprising:
estimating a frequency offset of the preamble; and
adjusting the output of one or more correlators to compensate for the estimated frequency offset.

6. The method of claim 5, further comprising estimating the frequency offset based on one or more of: output from one or more correlators, an averaged output of one or more groups of correlators.

7. The method of claim 1, wherein the first part of the preamble detector includes a plurality of early-arrival detectors, and wherein the second part of the preamble detector includes a plurality of late-arrival detectors.

8. The method of claim 1, wherein each of the short sequences has a same time duration as an orthogonal frequency division multiplexing (OFDM) symbol used to carry data traffic in the wireless communication system.

9. The method of claim 1, further comprising:
determining, by the preamble detector, a phase of the plurality of short sequences; and
based at least in part on the determined phase, using at least one of an early-arrival detector and a late-arrival detector to process at least one short sequence of the plurality of short sequences as part of calculating a propagation delay between the UE and the radio network node.

10. The method of claim 1, wherein the Tfrac is one of a plurality of computed Tfrac candidates, and wherein the calculating includes calculating the propagation delay between the UE and radio network node based on the plurality of computed Tfrac candidates.

11. A method in a user equipment (UE) for transmitting a preamble, wherein the preamble is comprised of a plurality of identical short sequences, the method comprising:
transmitting, by the UE a transmission characteristic part way through the transmission of the preamble to split the preamble into two portions, the transmitting including:
transmitting a first of the two portions of the preamble using a first transmission characteristic; and transmitting a second of the two portions of the preamble using a second transmission characteristic that is different from the first transmission characteristic, transmitting a second of the two portions of the preamble using a second transmission characteristic comprising generating a time offset between the two portions, the time offset being generated by the UE omitting the transmission of one or more sequence elements.

12. The method of claim 11, wherein the change in the transmission characteristic is based on at least one predefined transmission characteristic change.

13. The method of claim 11, wherein the preamble allows the radio network node to perform early and late arrival detection of the preamble and to determine therefrom a propagation delay between the UE and the radio network node.

14. The method of claim 11, further comprising:
receiving a timing advance from the radio network node that was based upon the determined propagation delay; and
adjusting a future transmission by the UE to the radio network node based on the timing advance.

15. The method of claim 11, wherein a signal power during a time between the transmission of the first and second portions of the preamble is not lower than a signal power used to transmit the first and second portions.

16. The method of claim 11, wherein the preamble is transmitted on a physical random access control channel (PRACH).

17. The method of claim 11, wherein the preamble includes a plurality of short sequences, each of the short sequences having a same time duration as an orthogonal frequency division multiplexing (OFDM) symbol used to carry data traffic in a wireless communication system.

18. The method of claim 11, wherein the first of the two portions includes a first repeated synchronization sequence and the second of the two portions includes a second repeated synchronization sequence, and wherein the first and second transmission characteristics differ in that the first repeated synchronization sequence and the second repeated synchronization sequence are different.

19. The method of claim 11, wherein the time offset is further generated by one or more of: inserting a small guard interval between the two portions, repeating one or more sequence elements and inserting a short cycle prefix between the two portions.

20. The method of claim 11, wherein the time offset is not an integer multiple of OFDM.

21. A method in a radio network node for processing a preamble, the method comprising:
detecting a change in a transmission characteristic of a preamble received from a user equipment (UE) part way through receiving the preamble, the change in transmission characteristic splitting the preamble into two portions, the preamble comprising a plurality of identical short sequences, a first of the two portions transmitted by the UE using a first transmission characteristic, and a second of the two portions transmitted by the UE using a second transmission characteristic that is different from the first transmission characteristic, and a difference between the first transmission characteristic and the second transmission characteristic being based on a predefined time offset inserted by the UE between the first portion and the second portion, the time offset being generated by the UE omitting the transmission of one or more sequence elements; and
determining, based on the two portions of the preamble, a propagation delay between the radio network node and the UE.

22. The method of claim 21, further comprising:
determining, based on a calculated propagation delay, a timing advance, wherein the UE uses the timing advance to adjust the timing of a future transmission to the radio network node; and
transmitting the timing advance to the UE.

23. The method of claim 21, wherein each of the short sequences has a same time duration as an orthogonal frequency division multiplexing (OFDM) symbol used to carry data traffic in the wireless communication system.

* * * * *